US006681398B1

(12) United States Patent
Verna

(10) Patent No.: US 6,681,398 B1
(45) Date of Patent: Jan. 20, 2004

(54) SYSTEMS, DEVICES AND METHODS FOR REVIEWING SELECTED SIGNAL SEGMENTS

(75) Inventor: Tony Verna, Pacific Palisades, CA (US)

(73) Assignee: ScanZ Communications, Inc., Santa Monica, CA (US)

( * ) Notice: Subject to any disclaimer, the term of this patent is extended or adjusted under 35 U.S.C. 154(b) by 0 days.

(21) Appl. No.: 09/228,929

(22) Filed: Jan. 12, 1999

Related U.S. Application Data

(60) Provisional application No. 60/110,468, filed on Nov. 30, 1998, and provisional application No. 60/071,119, filed on Jan. 12, 1998.

(51) Int. Cl.[7] .......................... H04N 7/16; H04N 5/445; G06F 3/00; G06F 13/00; G06F 17/00
(52) U.S. Cl. .......................... 725/141; 725/37; 463/40
(58) Field of Search .......................... 725/141, 139, 725/37, 38, 88, 87, 105, 135; 463/40, 41, 42; 273/317.1–317.6; H04N 7/16, 5/445; G06F 3/00, 13/00, 13/02

(56) References Cited

U.S. PATENT DOCUMENTS

| | | | |
|---|---|---|---|
| 4,110,792 A | 8/1978 | Long et al. .................. 358/240 |
| 4,183,056 A | 1/1980 | Evans et al. ................. 358/293 |
| 4,928,178 A | 5/1990 | Hipwell ....................... 358/160 |
| 4,977,503 A | * 12/1990 | Rudnick et al. ............. 273/461 |
| 4,982,279 A | 1/1991 | Ishii et al. ..................... 358/21 |
| 5,018,014 A | 5/1991 | Hashimoto ................... 358/183 |
| 5,034,811 A | 7/1991 | Palm ........................... 358/105 |
| 5,329,320 A | 7/1994 | Yifrach ........................... 360/8 |
| 5,508,695 A | * 4/1996 | Nelson et al. ............... 340/825 |
| 5,510,828 A | * 4/1996 | Lutterbach et al. ......... 725/138 |
| 5,513,384 A | * 4/1996 | Brennan et al. ............. 455/180 |
| 5,555,463 A | 9/1996 | Staron ......................... 348/559 |
| 5,568,205 A | 10/1996 | Hurwitz ....................... 348/705 |
| 5,621,473 A | 4/1997 | Hill ............................. 348/559 |
| 5,742,521 A | * 4/1998 | Ellenby et al. .............. 702/127 |

* cited by examiner

Primary Examiner—Vivek Srivastava
(74) Attorney, Agent, or Firm—Covington & Burling

(57) ABSTRACT

The present invention provides on-field sports officials and other similarly situated users with systems, methods and portable devices for monitoring, reviewing and evaluating sports, entertainment, news and other events and occurrences in nearly real time. These systems, methods and devices for example select and review images transmitted in a signal, such as a television signal of a football game or as another example from a security system camera. The system for selecting and reviewing signal segments comprises (i) a selection system including means for receiving at least one signal, means for identifying at least one segment of the signal, and means for transmitting the signal segment, and (ii) a reviewing system including means for receiving the signal segment, means for storing the signal segment, and means for reviewing information in the signal segment. The reviewing system may be a hand-held device, and may also include means for manipulating information in the signal segment, so that the user may, for example, rewind, fast-forward, freeze, enlarge or play in slow motion images from a sports or other event. In a preferred embodiment, a communications path is also established between the selection system and the receiving device, so that the user of the receiving device can obtain information about the selected signal segments and can transmit control signals to the selection system. On-field sports officials, for example, could use the present invention to operate an instant replay system independent from off-field personnel.

96 Claims, 4 Drawing Sheets

SYSTEMS, DEVICES AND METHODS FOR REVIEWING SELECTED SIGNAL SEGMENTS

This application claims benefit of Ser. No. 60/071,119 filed Jan. 12, 1998 and 60/110,468 filed Nov. 30, 1998.

BACKGROUND OF THE INVENTION

This invention relates to reviewing electronic images and other signals. More particularly, this invention relates to selecting and reviewing signal segments, including for example instant replay images and signals at sports, entertainment, news and other events, and in security systems.

DESCRIPTION OF THE RELEVANT ART

The invention of instant replay in 1963 revolutionized the way in which televised events are viewed. At the time, the notion of reviewing a portion of an event, only moments after it occurred, was entirely novel. Instant replay also had dramatic effects on how football games and other sports events are officiated.

The job of football officials, for example, includes making split-second decisions while simultaneously observing players, yard markers, boundaries and the ball. Occasionally, officials are confronted with difficult calls which would be easier to resolve with benefit of hindsight. Recognizing this, in 1986, major league football organizers adopted the use of instant replay during games as a tool to allow officials to review and correct "hard" or "close" calls.

As initially implemented, instant replay did not provide on-field officials with access to instant replay images. Rather, when a call was challenged, an off-field official reviewed available instant replay images of the relevant play, and described the review to on-field officials. The off-field official had access to instant replay images from each of several video cameras covering various angles and aspects of the play, but the on-field officials did not.

Instead of ensuring accuracy and quality of officiating, instant replay did not always resolve disputed calls. Instant replay sometimes also had negative effects on football games. Frequent challenges were made to calls by on-field officials. Lengthy delays, some lasting longer than five minutes, resulted while off-field officials reviewed plays, thereby expanding the duration of games, interrupting team momentum and disrupting mass media coverage. On-field officials were embarrassed when their calls were overturned. Accordingly, in 1991, the pragmatic problems faced by teams, referees, mass media producers and fans led major league football to terminate the use of instant replay during games.

Periodically, however, fans, players, officials, teams and mass media interests urge that instant replay be re-instituted. Today, television producers have integrated instant replay fully into their broadcasts and commentary on football and other sporting events. After a play, remote television viewers are often provided with instant replays from numerous camera angles. In a very real sense, television viewers now have some of the best seats for evaluating whether correct calls have been made. Even fans attending the games can see instant replay on large screen televisions situated around the playing field or on portable receivers they bring to the event. Meanwhile, officials are left to wait until post-game review to determine the accuracy of a call.

Accordingly, there is a need for a system that would provide sports event officials with portable on-field devices having substantial signal storage capacity, quality picture resolution, and zoom and slow-motion playback capabilities that would enable them in nearly real time to review, evaluate and, if necessary, change their judgments and calls. Such devices could also be used to review and evaluate other events, including entertainment and news events, and monitor real-life events and information reports. Such devices and systems also could be used as security systems at stores, commercial premises and other locations.

SUMMARY OF THE INVENTION

An object of the invention is to permit on-field sports officials to review and evaluate events without undue delay.

A further object of the invention is to provide a system and portable device to enable on-field sports officials to review and evaluate events without undue delay.

Another object of the invention is to provide a system and portable device to permit a user to surveil, monitor, review and evaluate entertainment, news, and other events and occurrences in nearly real time.

A further object of the invention is to provide a system and portable device for selecting and reviewing information included in a signal.

Another object of the invention is to provide a system and portable device for selecting and reviewing segments of a signal.

A further object of the invention is to provide a system and portable device for selecting signal segments and manipulating information included in signal segments, for example, by freezing the information or displaying the information in slow motion.

A further object of the invention is to provide a system and portable device wherein the user of the portable device can select signal segments based on information included in an auxiliary signal.

The present invention, as broadly described herein, provides a system for selecting and reviewing signal segments, including a selection system and a reviewing system, in which the selection system includes means for receiving at least one signal; means for identifying at least one segment of the signal, and means for transmitting the signal segment; and in which the reviewing system includes means for receiving the signal segment; means for storing the signal segment; means for reviewing information included in the signal segment; and, optionally, means for manipulating information included in the signal segment.

The present invention, as broadly described herein, provides a device for reviewing signal segments, including means for receiving at least one signal segment; means for storing at least one signal segment; means for reviewing information included in at least one signal segment; and, optionally, means for manipulating information included in at least one signal segment.

The present invention, as broadly described herein, also provides a method for selecting and reviewing signal segments, including the steps of receiving at least one signal into a selection system; identifying at least one segment of the signal; transmitting at least one signal segment from the selection system to a reviewing device; receiving at least one signal segment into the reviewing device; storing at least one signal segment in the reviewing device; reviewing information included in at least one signal segment; and, optionally, manipulating the information included in at least one signal segment.

The present invention, as broadly described herein, also provides a method for reviewing signal segments, including the steps of receiving at least one signal segment; storing the signal segment; reviewing information included in the signal segment; and, optionally, manipulating information included in the signal segment.

Additional aspects, objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Figure 1:
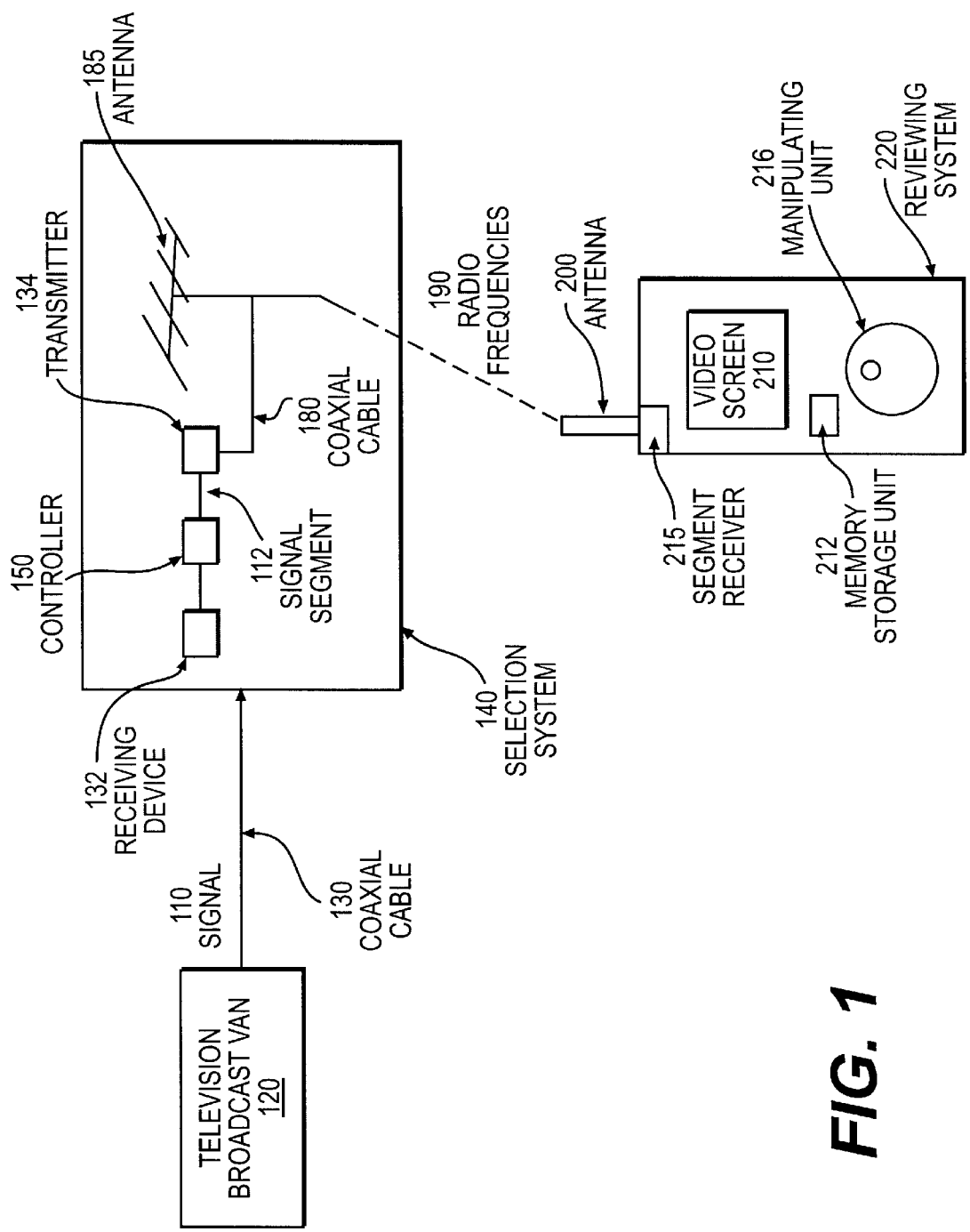
FIG. 1 is a diagram depicting a preferred embodiment of the system of the present invention for selecting and reviewing signal segments.

Reference will now be made in detail to the present embodiments of the invention, examples of which are illustrated in the accompanying drawings, wherein like reference numerals indicate like elements throughout the several views.

SYSTEM FOR SELECTING AND REVIEWING SIGNAL SEGMENTS

FIG. 1 depicts a preferred embodiment of a system, comprising a combination of elements for selecting and reviewing signal segments. As depicted in FIG. 1, the system includes a selection system 140 and a reviewing system 220. In the preferred embodiment depicted in FIG. 1, the selection system comprises means for receiving at least one signal, means for identifying at least one segment of at least one signal, and means for transmitting at least one signal segment. In the preferred embodiment depicted in FIG. 1, the reviewing system comprises means for receiving at least one signal segment, means for storing at least one signal segment, and means for reviewing information included in at least one signal segment.

In the preferred embodiment depicted in FIG. 1, the selection system 140 and the reviewing system 220 are at different locations. In another preferred embodiment not depicted in FIG. 1, the selection system 140 and the reviewing system 220 are at the same location.

THE SIGNAL

In the preferred embodiment depicted in FIG. 1, the signal 110 received by the selection system 140 comprises a television signal. In the preferred embodiment depicted in FIG. 1, signal 10 is a television signal that is transmitted from a television broadcast van 120. In another preferred embodiment not depicted in FIG. 1, the signal 110 originates from one or more other signal source providers, including one or more television broadcast vans, cable programming vans, video cameras, security system video cameras, satellite systems, Internet service providers, audio signal generators, remote editing locations, manual editing locations, intelligent editing locations, reviewing systems 220 or any other means for generating signals known to persons of skill in the art.

In a preferred embodiment, the signal 110 comprises the same signals, images or information transmitted to viewers by a television broadcast station. In other preferred embodiments, the signal 110 comprises the same signals, information or images transmitted to viewers or listeners by signal source providers, as known to persons of skill in the art.

In the preferred embodiment depicted in FIG. 1, the signal 110 is derived from at least one image. The image may comprise video images, audio images, data images or any other images known to persons of skill in the art. In a preferred embodiment, the image comprises images of a sporting event. In another preferred embodiment, the signal 110 comprises instant replay images of a sporting event. In another preferred embodiment, the signal 10 comprises a plurality of images. In yet other preferred embodiments, the images include images of at least one non-sporting event, such as a real-life event, entertainment event or a news event. In another preferred embodiment, the images comprise images derived from security system cameras located in a store, commercial premise or other location known to persons of skill in the art.

In a preferred embodiment not depicted in FIG. 1, the signal comprises an audio signal.

In a preferred embodiment not depicted in FIG. 1, a plurality of signals 110 is received by the selection system 140. In a preferred embodiment, the plurality of signals 110 may originate from a single television broadcast van 120 or any other single signal source. The plurality of signals 110 from the single signal source may, for example, comprise different camera angles of the same sporting event or other event, different images from different security system cameras at a commercial premise, or a plurality of other images as may be desired by the operator of the system of the present invention or by the operator(s) of the signal sources. In another preferred embodiment, a plurality of signals 110 may originate from a plurality of sources, as described above and known to persons of skill in the art, and may comprise a plurality of images as may be desired by the operator of the system of the present invention or by the operator(s) of the signal sources.

In another preferred embodiment, one or more of the plurality of signals 110 comprises data information. The data may describe a sporting event or other event. The data also may comprise statistics or information relating to the teams, players, performers or other participants or subjects of an event. The data also may comprise promotional materials, financial or stock market information, or other information as may be desired by the operator of the system of the present invention or by the operator(s) of the signal sources.

In another preferred embodiment not depicted in FIG. 1, a plurality of signals 110 is received by the selection system 140, and at least one of the plurality of signals 110 comprises a control signal. The control signal may be generated by a timing device, a play clock, other electronic equipment, a reviewing system or other means known to persons of skill in the art. In a preferred embodiment, the control signal is generated from a clock at a sporting event. The control signal may contain information indicating when a play at a sporting event commences. In a preferred embodiment, the control signal is generated based on a 25-second clock, a 35-second clock or a similar device (including a play count down clock at a football game or the shot clock at a basketball game), and contains information indicating when each play at the sporting event begins. In other preferred embodiments, the control signal may be manually-generated or received from other sources known to persons of skill in the art.

In another preferred embodiment not depicted in FIG. 1, the control signal originates from at least one reviewing system 220 and is transmitted from at least one reviewing system 220 to the selection system 140. In another preferred embodiment not depicted in FIG. 1, the control signal transmitted by the reviewing system 220 to the selection system 140 is in response to information included in an auxiliary signal transmitted (in either encrypted or unencrypted format) from the selection system 140 to at least one reviewing system 220. The auxiliary signals are explained more fully in the following description of the selection system 140.

In the preferred embodiment depicted in FIG. 1, the signal 110 is transmitted to the selection system 140 using coaxial cable 130. In other preferred embodiments not depicted in FIG. 1, the signals 110 are transmitted to the selection system 140 using twisted pair copper wires, radio frequencies, wireless technologies, wire technologies, infrared technologies, fiber optic technologies or other mediums for transmitting signals known to persons of skill in the art.

THE SELECTION SYSTEM

In the preferred embodiment depicted in FIG. 1, the selection system 140 comprises means for receiving at least one signal 110, means for identifying at least one segment of at least one signal, and means for transmitting at least one signal segment 112.

In the preferred embodiment depicted in FIG. 1, the selection system 140 is designed to operate near a sporting event, such as a football game, or another event, including an entertainment event or a news event. In a preferred embodiment not depicted in FIG. 1, the selection system 140 is located in an area of a stadium or a facility hosting a sporting event, news event, entertainment event or other event. In another preferred embodiment, the selection system 140 is located in proximity to a stadium or a facility hosting a sporting event, news event, entertainment event or other event. In other preferred embodiments, the selection system 140 is located at a distance from the signal source (e.g., television van 120) and from the reviewing system 220, where the distance is based, in part, on the technical characteristics of the selection system 140, the reviewing system 220, and the signal source, as known to one of skill in the art.

In another preferred embodiment, the selection system 140 is located in proximity to security system cameras at a commercial premise or other similar location known to person of skill in the art.

In the preferred embodiment depicted in FIG. 1, the selection system 140 is designed to occupy the smallest space necessary, consistent with environmental and other requirements, for the selection system 140 and its operator(s). In another preferred embodiment, not depicted in FIG. 1, the selection system 140 is located in a space larger than necessary for the selection system and its operator(s).

In the preferred embodiment depicted in FIG. 1, the selection system 140 is not portable, but can be easily moved. In another preferred embodiment not depicted in FIG. 1, the selection system 140 is portable. In yet another preferred embodiment, the selection system 140 is stationary.

The Receiving Means of the Selection System

The selection system 140 comprises means for receiving at least one signal 110. In the preferred embodiment depicted in FIG. 1, the receiving means comprises a receiving device 132 that can receive at least one signal 110. The receiving device 132 contains designs, components and circuitry which are known to persons of skill in the art.

In a preferred embodiment, the receiving device 132 includes a signal demodulator, which can demodulate a received signal 110 to a baseband signal. In a preferred embodiment, the receiving device 132 includes a RF tuner which can be adjusted to receive signals 110 transmitted on different frequencies. In another preferred embodiment, the RF tuner is fixed or pre-set to receive signals 110 transmitted on certain predetermined frequencies.

In another preferred embodiment, the receiving device 132 comprises an equalizing amplifier or another similar device that is capable of making up any loss experienced by the received signals 110 when transmitted between the signal source and the selection system 140.

In the preferred embodiment depicted in FIG. 1, the receiving device 132 comprises means to receive signals 110 transmitted by coaxial cable 130. In other preferred embodiments not depicted in FIG. 1, the receiving device 132 comprises means to receive signals 110 transmitted by copper wire, radio frequencies, wire technologies, wireless technologies, infra-red technologies, fiber optic technologies or other means known to persons of skill in the art.

In a preferred embodiment, the receiving device 132 can receive signals 110 in analog format. In another preferred embodiment, the receiving device 132 can receive signals 110 in digital format. In yet other preferred embodiments, the receiving device 132 can receive signals 110 in multiple formats or in any signal format known to persons of skill in the art.

In a preferred embodiment, the receiving device 132 contains a decoder which can convert a received analog signal 110, or any portion thereof, into a digital signal. The converted digital signal can be in any format known to persons of skill in the art, including formats having characteristics of 16-bit pixels, 640×480 pixel resolution, and 30 frames per second. The decoder comprises designs, components and circuitry as known to persons of skill in the art. In another preferred embodiment, the decoder is contained in the transmitter 134 of the selection system 140.

In a preferred embodiment, the receiving device 132 contains at least one compression unit capable of compressing converted digital signals, received digital signals 110, or both. The compression unit uses compression technology, including designs, components and circuitry, as known to persons of skill in the art. In another preferred embodiment, the compression unit is contained in the transmitter 134 of the selection system 140.

In a preferred embodiment, the receiving device 132 also includes a storing mechanism to store the received signals 110, the converted digital signals, the compressed signals, or any combination thereof. In a preferred embodiment, the storing mechanism comprises a SDRAM memory array. In other preferred embodiments, the storing mechanism comprises other devices for storing signals or images, or both, known to persons a of skill in the art. In at least one preferred embodiment, the storing mechanism comprises sufficient memory to store all signals associated with an event in its entirety, at least through the duration of the event. In another preferred embodiment, the storing mechanism is contained in the transmitter 134 of the selection system 140.

In a preferred embodiment, the receiving device 132 comprises a microprocessor to manage the functions of the receiving device 132, including the decoding of the signals, the compressing of the signals, and the storage of signals. The microprocessor comprises designs, components and circuitry as known to persons of skill in the art.

In a preferred embodiment, at least one receiving device 132 of the selection system 140 receives a control signal. In a preferred embodiment not depicted in FIG. 1, the control signal received by the receiving device 132 is transmitted to the selection system 140 from at least one reviewing system 220.

The Identifying Means of the Selection System

The selection system 140 also comprises means for identifying at least one segment of at least one signal 110. In a preferred embodiment not depicted in FIG. 1, the means for identifying at least one signal segment is inactive. In the preferred embodiment depicted in FIG. 1, the means for identifying at least one segment comprises at least one controller 150. As depicted in FIG. 1, controller 150 identifies at least one signal segment 112 of at least one signal 110 to be transmitted via transmitter 134 from the selection system 140 to one or more reviewing systems 220. A signal segment 112 can comprise a portion of a signal 110, a digital signal; a compressed signal, a stored signal, or any combination thereof. A signal segment 112 also can comprise at least one image, at least one audio signal, at least one combined audio and image signal, at least one data signal, at least one combined audio, data and image signal, or at least one combined data and audio signal, or any other type of signal known to persons of skill in the art.

In a preferred embodiment, the signal segment 112 may comprise at least one image of a particular portion of a sporting event or other event. In another preferred embodiment, the signal segment 112 may comprise an instant replay image of a particular portion of a sporting event or other event. In another preferred embodiment, the signal segment 112 may comprise images derived from security system cameras located in a store, commercial premise or other location known to persons of skill in the art.

In another preferred embodiment, the controller 150 may identify a plurality of signal segments 112 derived from a single signal 110. In another preferred embodiment, the controller 150 may identify a single signal segment 112 from a plurality of signals 110. In another preferred embodiment, the controller 150 may identify a plurality of signal segments 112 derived from a plurality of signals 110.

In a preferred embodiment not depicted in FIG. 1, at least one controller 150 comprises a manual identification system. A manual identification system preferably enables a person to identify at least one signal segment 112 to be transmitted from the selection system 140 to one or more reviewing systems 220.

In a preferred embodiment not depicted in FIG. 1, the manual selection system of the controller 150 includes at least one reviewing unit and at least one control unit. In a preferred embodiment not depicted in FIG. 1, the reviewing unit of the controller 150 comprises a device for reviewing information included in the signals, for example, at least one monitor to enable a person to review at least one signal 110 received by the selection system 140. In another preferred embodiment, a monitor of the reviewing unit enables a person to review information included in one or more digital signals, compressed signals or stored signals, or any combination thereof, received, stored or processed in the selection system 140.

The monitors of the reviewing unit may consist of one or more video monitors or other similar devices, known to persons of skill in the art. The monitors can have different picture resolutions known to persons of skill in the art. The monitors can display images in color or in monochrome. The monitors may also comprise audio receiving and monitoring mechanisms, with stereo, monophonic or other audio receiving and processing capabilities, as known to persons of skill in the art.

The manual identification system of the controller 150, not depicted in FIG. 1, also may comprise a control unit which enables a person to input information into the selection system 140 and thereby to select a portion of a signal 110, a digital signal, a compressed signal or a stored signal to be transmitted from the selection system 140 to one or more reviewing systems 220. The control unit can include a keyboard, a button, a mouse, or a similar input component known to persons of skill in the art for inputting information into the selection system 140. By operating the control unit, an operator can select a signal segment 112 to be transmitted via transmitter 134 to one or more reviewing systems 220. Also by operating the control unit, a person can select a plurality of signal segments 112 to be transmitted via transmitter 134 to one or more reviewing systems 220.

In a preferred embodiment, the manual identification system of the controller 150 also includes an element for manipulating information included in the signals 110, the signal segments 112, the digital signals, the compressed signals and the stored signals that are being displayed on the reviewing unit of the manual selection system. The manipulation element can include means for changing the speed of review (i.e. fast-forwarding), repeatedly reviewing (i.e. rewinding), freezing, scaling or otherwise manipulating the signals 110, the signal segments 112, the digital signals, the compressed signals or the stored signals, or any images, audio signals, or data derived therefrom. The manipulation element also may include means for implementing slow-motion functions or other functions for adjusting playback speed known to persons of skill in art. The manipulation element can provide for a variety of speeds in the manipulation of the signal 110, the signal segment 112, the digital signals, the compressed signals and the stored signals. The manipulation element can be operated using the control unit of the manual identification system, or another keyboard, button, mouse or input or control means known to persons of skill in the art.

In another preferred embodiment, not depicted in FIG. 1, at least one controller 150 is responsive to a control signal received by the selection system 140. The control signal may, for example, include information indicating when a signal segment 112 should begin, when a signal segment 112 should end, or both. In a preferred embodiment, the control signal includes information indicating when plays of a sporting event begin. This information can be obtained at a football game by monitoring a 25-second clock, a 35-second clock or any other game clock or play clock which is reset or manipulated each time a new play begins or when a play ends. In a preferred embodiment, the control signal received by the selection system 140 at a football game includes information indicating when the 25-second clock, the 35-second clock (or similar device) is reset or when a new play begins. The control signal can be generated manually. Alternatively, for example, the control signal also can be generated automatically by connecting the 25-second clock or 35-second clock (or similar device) to the selection system 140.

In another preferred embodiment, the control signal is transmitted to the selection system 140 by at least one reviewing system 220. In this preferred embodiment, the controller 150 of the selection system 140 selects a signal segment 112 from a signal 110 in response to a control signal transmitted by the reviewing system 220. In a preferred embodiment, a control signal is transmitted from the reviewing system 220 to the selection system 140 using radio frequencies, wireless technologies, wire technologies, infrared technologies, lasers, copper wire, coaxial cable, fiber optic cable or any other means known to persons of skill in the art.

In yet another preferred embodiment, a control signal is used to instruct the controller 150 to identify a signal segment 112 from a signal 110 received by the selection system 140 at a beginning of a play of a football game or other sporting event. In a preferred embodiment, the signal 110, from which the signal segments 112 are identified in response to the control signal, includes video images. In another preferred embodiment, the signal 110, from which the signal segments 112 are identified in response to the control signal, includes a combination of any of images, audio signals, or data signals. The means for using a control signal to instruct the controller 150 to identify a signal segment 112 of a signal 110 received by the selection system 140 are known to persons of skill in the art.

In another preferred embodiment, at least one controller 150 comprises an automatic identification system. An automatic identification system, for example, can cause a signal segment 112 to be identified from a signal 110 at predetermined time intervals or in accordance with some data or other predetermined criteria, as is known to one of skill in the art. In a preferred embodiment, the automatic identification system operates in response to a control signal indicating when a signal segment 112 should begin, when a signal segment 112 should end, or both. In a preferred embodiment, the control signal contains information indicating when each play of a sporting event begins. This information can be obtained at a football game, for example, by monitoring a 25-second clock, a 35-second clock or any other game clock or play clock which is reset or manipulated each time a new play begins or when a play ends.

In a preferred embodiment, the signal 110, from which the signal segments 112 are identified in response to the automatic identification system, includes videos images. In another preferred embodiment, the signal 110, from which the signal segments 112 are identified in response to the automatic identification system, includes a combination of any of video images, audio signals, or data signals. The means for using a control signal to instruct the controller 150 to identify a signal segment 112 of a signal 110 received by the selection system 140 are known to persons of skill in the art.

In another preferred embodiment not depicted in FIG. 1, the selection system 140 also comprises means for generating at least one auxiliary signal. In a preferred embodiment not depicted in FIG. 1, the means for generating auxiliary signals comprises at least one auxiliary unit. The auxiliary unit comprises designs, components, and circuitry for generating signals as are known to persons of skill in the art. In a preferred embodiment, at least one auxiliary unit is included in the controller 150 of the selection system 140. In another preferred embodiment, at least one auxiliary unit is included in the transmitter 134 of the selection system 140. In yet another preferred embodiment, at least one auxiliary unit is a separate unit within the selection system 140.

In a preferred embodiment, at least one auxiliary signal (in either encrypted or unencrypted format) generated by the auxiliary unit comprises information describing at least one signal 110 received by the selection system 140. For example, when the system of the present invention is used at a football game, at least one auxiliary signal may comprise information describing the source of at least one signal 110, including whether the signal 110 originates from a television broadcast van 120, a cable programming van, a remote editing location, a manual editing location, an intelligent editing location, or any other means for generating signals known to persons of skill in the art.

By way of another example, at least one auxiliary signal may comprise information describing the information included in the signal 110. For example, when the selection system 140 is used at a football game, at least one auxiliary signal may comprise information describing the contents of at least one signal 110, including the camera angle of the images included in the signal 110 or any other information relating to the contents or information included in the signal 110 as may be known to persons of skill in the art. In yet other preferred embodiments, at least one auxiliary signal comprises other information about at least one signal 110 as may be desired by the operator of the system of the present invention, by the operator of the selection system 140 or by the operator(s) of the signal sources 110.

In another preferred embodiment not depicted in FIG. 1, at least one auxiliary signal (in either encrypted or unencrypted format) generated by the auxiliary unit comprises information describing at least one signal segment 112 identified by the controller 150 of the selection system 140. For example, in a preferred embodiment, at least one auxiliary signal comprises information describing the information contained in the signal segments 112 that have been identified by the controller 150 of the selection system 140. In another preferred embodiment, at least one auxiliary signal comprises information describing the information contained in the signal segments 112 that are stored in the storing mechanism of the selection system 140. In other preferred embodiments, at least one auxiliary signal comprises other information about the signal segments 112 as may be desired by the operator of the system of the present invention or by the operator(s) of the signal sources.

In another preferred embodiment not depicted in FIG. 1, the selection system 140 also comprises means for encrypting at least one signal segment 112 or auxiliary signal. In a preferred embodiment not depicted in FIG. 1, the encrypting means comprises at least one encryption unit. The encryption unit comprises designs, components and circuitry for encrypting signal segments 112 or auxiliary signals as are known to persons of skill in the art. In a preferred embodiment, at least one encryption unit is included in the controller 150 of the selection system 140. In another preferred embodiment, at least one encryption unit is included in the transmitter 134 of the selection system 140. In yet another preferred embodiment, at least one encryption unit is a separate unit within the selection system 140.

In another preferred embodiment not depicted in FIG. 1, the selection system 140 also comprises means for addressing at least one signal segment 112 or auxiliary signal to one or more selected reviewing systems 220. Preferably, only the selected reviewing systems include means for reviewing information included in the addressed signal segment 112 or auxiliary signal. In a preferred embodiment not depicted in FIG. 1, the addressing means comprises at least one addressing unit. The addressing unit comprises designs, components and circuitry for addressing signal segments 112 and auxiliary signals as are known to persons of skill in the art. In a preferred embodiment, at least one address unit is included in the controller 150 of the selection system 140. In another preferred embodiment, at least one address unit is included in the transmitter 134 of the selection system 140. In yet another preferred embodiment, at least one address unit is a separate unit within the selection system 140.

The Transmitting Means of the Selection System

The selection system 140 also comprises transmitting means. As depicted in FIG. 1, the transmitting means comprises at least one transmitter 134 for transmitting at least one unencrypted signal segment 112 from the selection system 140 to one or more reviewing systems 220. In another preferred embodiment, at least one transmitter 134 can transmit at least one unencrypted auxiliary signal from the selection system 140 to one or more reviewing systems 220. In a further preferred embodiment, at least one transmitter 134 can transmit at least one signal segment 112 to at least one reviewing system 220 in encrypted format. In another preferred embodiment, at least one transmitter 134 can transmit at least one auxiliary signal to at least one reviewing system 220 in encrypted format.

In a preferred embodiment depicted in FIG. 1, the transmitter 134 is connected via coaxial cable 180 to antenna 185, and signal segments 112 or auxiliary signals are transmitted via radio frequencies 190 to reviewing system 220. In a preferred embodiment, the transmitter 134 comprises a tuner which tunes the transmitter 134 to transmit using predetermined radio frequencies 190. Alternatively, in another preferred embodiment, the transmitter 134 comprises a tuner which can be tuned to transmit on a variety of radio frequencies 190. In a preferred embodiment, the transmitter 134 can transmit signal segments 112 or auxiliary signals using Channels 2 through 69 (or any portion thereof) of the VHF and UHF television broadcast frequencies.

In a preferred embodiment not depicted in FIG. 1, the transmitter 134 includes at least one bandpass filter to mitigate potential interference to transmissions on frequencies adjacent to the radio frequencies 190 used for transmitting and receiving signal segments 112 or auxiliary signals. In another preferred embodiment not depicted in FIG. 1, a plurality of bandpass filters is included in the transmitter 134 to maintain flexibility to transmit using a variety of radio frequencies 190.

In other preferred embodiments, the transmitter 134 uses other mediums for transmitting signal segments 112 or auxiliary signals known to persons of skill in the art, including co-axial cable 180, wireless technologies, wire technologies, infra-red technologies, fiber optic technologies, copper wire, laser signals or other means known to one of skill in the art. The transmitter 134 comprises designs, components and circuitry known to persons of skill in the art.

In a preferred embodiment, the transmitter 134 transmits the signal segments 112 (in either encrypted or unencrypted format) to the reviewing systems 220 in digital format. In an alternative preferred embodiment, the transmitter 134 transmits the signal segments 112 (in either encrypted or unencrypted format) to the reviewing systems 220 in an analog format.

In a preferred embodiment, the transmitter 134 transmits auxiliary signals (in either encrypted or unencrypted format) to the reviewing systems 220 in digital format. In an alternative preferred embodiment, the transmitter 134 transmits auxiliary signals (in either encrypted or unencrypted format) to the reviewing systems 220 in analog format.

As depicted in FIG. 1, the antenna 185 is a separate physical structure from the unit that holds other components and circuitry of the selection system 140. In an alternative preferred embodiment, the antenna 185 can be integrated into the same unit that holds the other components of the selection system 140.

In a preferred embodiment, the transmitting antenna 185 is selected to cause the signal segments 112, the auxiliary signals, or the radio frequency signals 190, or any combination thereof, to have a signal level of not less than approximately 1000 uV/m when received at the reviewing system 220. In another preferred embodiment, the transmitting antenna 185 is selected to cause the signal segments 112, the auxiliary signals, or the radio frequency signals 190, or any combination thereof, to have a different signal level when received at the reviewing system 220. In a preferred embodiment, the transmitting antenna 185 is passive, as is known to one of skill in the art. In another preferred embodiment, the transmitting antenna 185 is active, as is known to one of skill in the art. In another preferred embodiment, antenna 185 has other transmission characteristics, such as signal polarization, suitable for the particular application as are known to one of skill in the art.

In another preferred embodiment, the transmitter 134 comprises at least one decoder, at least one compression unit, or at least one storing mechanism, or any combination thereof. The decoder, the compression unit and the storing mechanism are described more fully with respect to the description of the receiving device 132.

In another preferred embodiment, the transmitter 134 comprises a microprocessor to manage the functions of the transmitter 134. Such microprocessors for managing transmitters are known to persons of skill in the art.

In a preferred embodiment the transmitter 134 transmits signal segment 112 (in either encrypted or unencrypted form) using radio frequencies 190 to one or more reviewing systems 220 essentially simultaneously as the signal 110 corresponding to such signal segment 112 is received by the selection system 140, and essentially simultaneously as the images or sounds included in signal segment 112 are transmitted to viewers or listeners by a television broadcast station or other means for transmitting signals, sounds and images to viewers or listeners. This timing enables a person using a reviewing system 220 to review signal segment 112 essentially simultaneously as the images, corresponding to the images included in the signal segment 112, are being viewed by television broadcast or other viewers.

In another preferred embodiment, the transmitter 134 transmits signal segment 112 (in either encrypted or unencrypted form) to one or more reviewing systems 220 at some time after the signal 110 corresponding to such signal segment 112 is received by the selection system 140.

In a preferred embodiment, the transmitter 134 essentially simultaneously transmits auxiliary signals and signal segments 112 (in either encrypted or unencrypted format) using radio frequencies 190 to one or more reviewing systems 220. In another preferred embodiment, there are a plurality of transmitters 134 that essentially simultaneously transmit auxiliary signals (in either encrypted or unencrypted format) and signal segments 112 (in either encrypted or unencrypted format) to one or more reviewing systems 220.

In another preferred embodiment, at least one transmitter 134 transmits signal segments 112 (in either encrypted or unencrypted form) to one or more reviewing systems 220 some time before or after an auxiliary signal is transmitted to one or more reviewing systems 220.

THE REVIEWING SYSTEM

The preferred embodiment depicted in FIG. 1 comprises one or more reviewing systems 220. Each reviewing system 220 comprises means for receiving at least one signal segment 112, means for storing at least one signal segment 112, and means for reviewing information included in at least one signal segment 112. Each reviewing system 220 preferably may be operated separately and independently from other reviewing systems 220.

In another preferred embodiment not depicted in FIG. 1, the reviewing system 220 comprises means for receiving at least one auxiliary signal transmitted by the selection system 140. In another preferred embodiment, the reviewing system 220 also has means for storing at least one auxiliary signal. In another preferred embodiment, the reviewing system 220 comprises means for reviewing information included in at least one auxiliary signal.

In another preferred embodiment not depicted in FIG. 1, at least one reviewing system 220 includes means for generating at least one control signal and transmitting at least one control signal to the selection system 140. In another preferred embodiment, the control signal generated by the reviewing system 220 is in response to information included in at least one auxiliary signal.

In another preferred embodiment not depicted in FIG. 1, at least one reviewing system 220 has means for responding to a user-flag signal. In another preferred embodiment, the reviewing system, in response to the user-flag signal, flags a portion of at least one signal segment 112. In another preferred embodiment, the reviewing system has means for reviewing information included in a flagged portion of at least one signal segment 112 in response to a user-rewind signal. In another preferred embodiment not depicted in FIG. 1, the reviewing system 220 has means for responding to a bookmark signal as is known to persons skilled in the art.

In the preferred embodiment depicted in FIG. 1, the reviewing system 220 is portable. In another preferred embodiment, the reviewing system 220 is light-weight and small enough to be held and operated with a single hand. In another preferred embodiment, the reviewing system 220 comprises a weather resistant casing. In another preferred embodiment, the reviewing system 220 can be placed in a holster belt attachment. In other preferred embodiments one or more reviewing systems 220 may be permanently fixed, temporarily fixed or otherwise configured as may be needed for particular events or other applications, including security system applications, as would be apparent to users or persons of skill in the art.

In a preferred embodiment, the reviewing system 220 comprises a power source. The power source may comprise at least one battery or any other source for powering electronic devices or systems, including hand-held electronic devices, known to persons of skill in the art. Any batteries included in the power source of the reviewing system 220 may be rechargeable or non-rechargeable.

Means for Receiving at Least One Signal Segment

The reviewing system 220 comprises means for receiving at least one signal segment 112 (in either encrypted or unencrypted format) transmitted by the selection system 140. In another preferred embodiment, the reviewing system 220 comprises means for receiving at least one auxiliary signal (in either encrypted or unencrypted format) transmitted by the selection system 140. In the preferred embodiment depicted in FIG. 1, the receiving means comprises at least one segment receiver 215 which can receive one or more signal segments 112 from the selection system 140. In another preferred embodiment, the segment receiver 215 can receive one or more auxiliary signals from the selection system 140. The segment receiver 215 includes designs, components and circuitry known to persons of skill in the art.

In a preferred embodiment, the segment receiver 215 receives at least one signal segment 112, auxiliary signal, or a combination thereof, in unencrypted format. In another preferred embodiment, the segment receiver 215 receives at least one signal segment 112, one auxiliary signal or a combination thereof, in encrypted or unencrypted format.

In another preferred embodiment not depicted in FIG. 1, the segment receiver 215 comprises means for decrypting at least one encrypted signal segment 112 or at least one encrypted auxiliary signal or a combination thereof. In a preferred embodiment, the decrypting means comprises a decryption unit. The decryption unit comprises designs, components, and circuitry for decrypting signal segments 112, or auxiliary signals, or a combination thereof, as are known to persons of skill in the art.

In another preferred embodiment not depicted in FIG. 1, the segment receiver 215 comprises means for decoding at least one addressed signal segment 112 or at least one addressed auxiliary signal or a combination thereof. In a preferred embodiment, the decoding means comprises an address decoder unit. The address decoder comprises designs, components, and circuitry for decoding addressed signal segments 112 or addressed auxiliary signals, or a combination thereof, as are known to persons of skill in the art.

In other preferred embodiments, the segment receiver 215 comprises a RF tuner, a demodulator, or both. The RF tuner preferably comprises a unit capable of receiving the signal segments 112 or auxiliary signals on the same frequencies 190 used for transmitting the signal segments 112 or auxiliary signals by the selection system 140. The demodulator preferably comprises a unit capable of demodulating at least one signal segment 112 or auxiliary signal to a baseband signal from the frequencies 190 used for transmitting the signal segments 112 or auxiliary signals by the selection system 140. In a preferred embodiment, the segment receiver 215 receives signal segments 112 or auxiliary signals transmitted in digital format. In an alternative preferred embodiment, the segment receiver 215 receives signal segments 112 or auxiliary signals transmitted in analog format.

In the preferred embodiment depicted in FIG. 1, the segment receiver 215 receives signal segments 112 or auxiliary signals transmitted using radio frequencies 190. In alternative preferred embodiments not depicted in FIG. 1, the segment receiver 215 receives signal segments 112 or auxiliary signals transmitted by coaxial cable, lasers, copper wire, wireless technologies, wire technologies, infra-red or fiber optic technologies, or other means known to persons of skill in the art.

In the preferred embodiment depicted in FIG. 1, the segment receiver 215 comprises an antenna 200. The antenna 200 can be produced using either a flexible material or a non-flexible material, or both. In a preferred embodiment, the antenna 200 is omni-directional and can receive signal segments 112 or auxiliary signals or a combination thereof from the selection system 140, regardless of the direction or plane in which the reviewing system 220 is oriented. In another preferred embodiment, the antenna 200 is directional. Antenna 200 possesses features known to persons of skill in the art.

In the preferred embodiment depicted in FIG. 1, the antenna 200 is external to the reviewing system 220. In an alternative preferred embodiment not depicted in FIG. 1, the antenna for reviewing system 220 is contained inside the casing of the reviewing system 220. In an alternate preferred embodiment not depicted in FIG. 1, the antenna for the reviewing system 220 is retractable within the casing of the reviewing system 220. Alternate configurations of the antenna 200 for reviewing system 220 are known to one of skill in the art.

Means for Storing At Least One Signal Segment

The reviewing system 220 comprises means for storing at least one signal segment 112. In the preferred embodiment depicted in FIG. 1, the storage means comprises at least one memory storage unit 212 for storing at least one signal segment 112 transmitted by the selection system 140. In a preferred embodiment depicted in FIG. 1, the reviewing system 220 has a plurality of memory storage units 212 for storing a plurality of signal segments 112 transmitted by the selection system 140. In a preferred embodiment, the memory storage units 212 of the reviewing system 220 comprise digital recording chips as known to persons of skill in the art. In another preferred embodiment, the memory storage units 212 comprise analog recording chips. Alternate means for storing signal segments 112 within reviewing system 220 are known to one of skill in the art.

In a preferred embodiment, at least one memory storage unit 212 has a capacity for storing a signal segment 112 of at least 120-seconds in duration. In another preferred embodiment, at least one memory storage unit 212 has a capacity for storing a signal segment 112 of at least 115-seconds in duration. In another preferred embodiment, at least one memory storage unit 212 has a capacity for storing a signal segment 112 of at least 90-seconds in duration. In another preferred embodiment, at least one memory storage unit 212 has a capacity for storing a signal segment 112 of at least 45-seconds in duration. In a preferred embodiment, there are a plurality of memory storage units 212, each having the same storage capacity. In another preferred embodiment, there are a plurality of memory storage units 212, at least two of which have different storage capacities.

In a preferred embodiment not depicted in FIG. 1, the reviewing system 220 comprises a change unit, as known to one of skill in the art, which enables a signal segment 112 stored in a memory storage unit 212 to be erased or deleted.

In a preferred embodiment not depicted in FIG. 1, the reviewing system 220 comprises a means, as known to one of skill in the art, for transferring at least one signal segment 112 stored in a memory storage unit 212 to a recording device external to reviewing system 220, including a VCR tape, a computer device, or some other recording means known to persons of skill in the art.

In a preferred embodiment, at least one memory storage unit 212 can be used for storing at least one auxiliary signal transmitted by the selection system 140 to the reviewing system 220. In another preferred embodiment not depicted in FIG. 1, the change unit of the reviewing system 220 enables an auxiliary signal stored in a memory storage unit 212 to be erased or changed. In another preferred embodiment not depicted in FIG. 1, the reviewing system 220 comprises means, as known to one of skill in the art, for transferring at least one auxiliary signal stored in a memory storage unit 212 to a recording device external to reviewing system 220, including a VCR tape, a computer device, or some other recording means known to persons of skill in the art.

Means for Reviewing Information Included in at Least One Signal Segment

In the preferred embodiment depicted in FIG. 1, the reviewing system 220 has a means for reviewing information included in at least one signal segment 112 transmitted by the selection system 140 and received by the reviewing system 220. As is known in the art, the term "reviewing information" includes all processing (and components for processing) of electronic signals necessary, useful or desirable for transforming electronic signals (including radio, light, infra-red, and magnetic) into visual, audio, audio-visual or other images that may be perceived by individuals.

The information reviewed by the reviewing system may 220 comprise information included in at least one signal segment stored in a memory storage unit 212. Alternatively, the reviewed information may comprise information included in at least one signal segment 112 that is essentially simultaneously received and reviewed by the reviewing system 220.

In a preferred embodiment not depicted in FIG. 1, the reviewing system-220 has means for reviewing information included in at least one auxiliary signal. The information may comprise, for example, a video image, a sound image, or a data image describing the source of at least one signal 110 received by the selection system 140 or information included in at least one signal segment 112 identified by the selection system 140. In another preferred embodiment, the image from the auxiliary signal comprises a menu or listing of a plurality of signals 110 received by the selection system 140. In another preferred embodiment, the image from the auxiliary signal comprises a menu or listing of the information contained in a plurality of signal segments 112 identified by the selection system 140. In another preferred embodiment, the auxiliary signal comprises an audio description of one or more signals 110 or one or more signal segments 112.

In a preferred embodiment, the information in the auxiliary signal is reviewed essentially simultaneously with the receipt by the reviewing system 220 of the auxiliary signal. In another preferred embodiment, the information is reviewed after the auxiliary signal has been received by the reviewing system 220 and stored in a memory storage unit 212 or other storage unit associated with the reviewing system 220.

In the preferred embodiment depicted in FIG. 1, the reviewing means comprises a video screen 210 which can display images, including video or data images, derived from a signal segment 112, or an auxiliary signal, or a combination thereof. The video screen 210 can comprise an LCD display screen or other video display technology known to persons of skill in the art. For example, video screen 210 may comprise an eyepiece, such as glasses, goggles, binoculars or monoculars, which when looked through contain a screen for viewing images. In a preferred embodiment not depicted in FIG. 1, the video screen 210 is included in an eyepiece that is not physically included in the same casing as reviewing system 220.

In a preferred embodiment not depicted in FIG. 1, the reviewing system 220 comprises a plurality of video screens 210 or other video display technology for essentially simultaneously reviewing information included in a plurality of stored signal segments or received signal segments 112, stored auxiliary signals or received auxiliary signals, or any combination thereof. In another preferred embodiment not depicted in FIG. 1, the reviewing means comprises at least one audio speaker, as is known to persons of skill in the art, to play back any audio portions of the signal segment 112, or auxiliary signal or a combination thereof. In another preferred embodiment not depicted in FIG. 1, the reviewing system 220 comprises a combination of at least one video screen and at least one audio speaker.

In the preferred embodiment depicted in FIG. 1, the reviewing means further comprises a means for manipulating at least one signal segment 112 stored in a memory storage unit 212 or received essentially simultaneously by the signal segment receiver 215 of the reviewing system 220. In the preferred embodiment depicted in FIG. 1, the manipulating means comprises a manipulating unit 216. In this preferred embodiment, the manipulating unit 216 comprises means for selecting which images derived from stored signal segments 112 or simultaneously received signal segments 112 are to be reviewed on the video screen 210, the audio speakers, or the other reviewing means of the reviewing device 220. The means used by the manipulating unit 216 for selecting the images to be reviewed comprises designs, components, and circuitry known to persons of skill in the art.

In another preferred embodiment, the reviewing means further comprises a means for manipulating at least one auxiliary signal stored in a memory storage unit 212 or received essentially simultaneously by the segment receiver 215 of the reviewing system 220. In the preferred embodiment depicted in FIG. 1, the manipulating means comprises a manipulating unit 216. In this preferred embodiment, the manipulating unit 216 comprises means for selecting which images derived from stored auxiliary signals, or essentially simultaneously received auxiliary signals, are to be reviewed on the video screen 210, the audio speakers, or the other reviewing means of the reviewing device 220. The means used by the manipulating unit 216 for selecting the images to be reviewed comprises designs, components, and circuitry known to persons of skill in the art.

In a preferred embodiment not depicted in FIG. 1, the manipulating unit 216 comprises means for controlling the manner in which an image derived from a signal segment 112 or an auxiliary signal is reviewed on the video screen 210, the audio speakers, or the other reviewing means. In a preferred embodiment, the manipulating unit 216 comprises means for changing the speed of review (i.e. fast-forwarding) of information included in signal segment 112 or auxiliary signal on at least one video screen 210. In another preferred embodiment, the manipulating unit 216 comprises means for fast-forwarding information included in at least one signal segment 112 on at least one audio speaker or other reviewing means of the reviewing system 220. In a preferred embodiment, the manipulating unit 216 enables a person to adjust the speed at which information included in a signal segment 112 or an auxiliary signal is fast-forwarded. The means for fast-forwarding comprises design, components, and circuitry known to persons of skill in the art.

In a preferred embodiment, the manipulating unit 216 comprises means for repeatedly reviewing (i.e. rewinding or playing back) information included in at least one signal segment 112 or auxiliary signal on at least one video screen 210. In another preferred embodiment the manipulating unit 216 comprises means for rewinding or playing back information included in at least one signal segment 112 or auxiliary signal on at least one audio speaker or other reviewing means of the reviewing system 220. In a preferred embodiment, the manipulating unit 216 enables a person to adjust the speed at which information included in a signal segment 112 or auxiliary signal is rewound or played back. The means for rewinding or playing back comprises designs, components, and circuitry known to persons of skill in the art.

In a preferred embodiment, the manipulating unit 216 comprises means for freezing at least one signal segment 112 or auxiliary signal at the location of at least one image and displaying that image on at least one video screen 210. In another preferred embodiment, the manipulating unit 216 comprises a means for freezing at least one signal segment 112 or auxiliary signal on at least one other reviewing means of the reviewing system 220. The means for freezing a signal segment 112 at a particular location and reviewing the information at that location comprises designs, components, and circuitry known to persons of skill in the art.

In a preferred embodiment, the manipulating unit 216 comprises means for reviewing information included in a signal segment 112 or auxiliary signal in slow motion on at least one video screen 210, or on at least one audio speaker, or other reviewing means of the reviewing system 220. In a preferred embodiment, the manipulating unit 216 enables a person to adjust the slow motion speed of the images. The means for reviewing a signal segment 112 or auxiliary signal in slow motion, and for adjusting the speed of that motion comprises designs, components, and circuitry known to persons of skill in the art.

In a preferred embodiment, the manipulating unit 216 comprises means for scaling at least one video image included in at least one signal segment 112 stored or essentially simultaneously received by the reviewing system 220 or one auxiliary signal stored or essentially simultaneously received by the reviewing system 220. The image can be scaled by enlarging a portion of the image displayed on the video screen 210 or other reviewing means. The image also can be scaled by reducing the size of an electronic image displayed on the video screen 210 or other reviewing means. In a preferred embodiment, the manipulating unit 216 enables a person to adjust the size of the scaled image. The means for scaling an image comprises designs, components, and circuitry known to persons of skill in the art.

In a preferred embodiment not depicted in FIG. 1, the manipulating unit 216 also comprises means for selecting, for scaling, a portion of an image displayed on video screen 210. Structures and techniques for selecting a portion of a video image for scaling are known to persons of skill in the art.

The manipulating unit 216 comprises a microprocessor or other means known to persons of skill in the art for controlling the various functions of the manipulating unit 216. In another preferred embodiment, the reviewing system 220 comprises a microprocessor or other means known to persons of skill in the art for controlling the various functions of the reviewing system 220.

Transmitting Means of Reviewing System

In a preferred embodiment not depicted in FIG. 1, the reviewing system 220 further comprises means for generating at least one control signal. In a preferred embodiment not depicted in FIG. 1, the means for generating a control signal by the reviewing system 220 comprises at least one signal generator. The signal generator comprises designs, components and circuitry for generating signals known to persons of skill in the art.

In another preferred embodiment not depicted in FIG. 1, the signal generator of the reviewing system 220 generates a control signal in response to information included in at least one auxiliary signal received by the reviewing system 220. By way of example, when the system of the present invention is used at a football game, the auxiliary signal received and reviewed by the reviewing system 220 may include information (in the form of a menu, listing or other display known to persons of skill in the art) describing a plurality of signal segments 112 which can be transmitted from the selection system 140 to the reviewing system 220. The reviewing system 220 also comprises means for enabling a user to select which of these available signal segments 112 will be transmitted from the selection system 140 to the reviewing system 220. This selection means comprises a selection device which enables a user to select the desired signal segments based on the information included in the auxiliary signal. The selection device of the reviewing system 220 may comprise a button, dial, pointer or other means for selecting an item from a menu, listing or other display known to persons of skill in the art. In a preferred embodiment, the signal generator of the reviewing system 220 generates at least one control signal in response to the selection of at least one desired signal segment 112 by the user of the reviewing system 220.

In another preferred embodiment not depicted in FIG. 1, the reviewing system 220 comprises means for transmitting at least one control signal from the reviewing system 220 to the selection system 140. In a preferred embodiment, the transmitting means of the reviewing device 220 comprises a transmit unit. The transmit unit comprises designs, components and circuitry for transmitting signals known to persons of skill in the art. In a preferred embodiment, at least one control signal transmitted by the transmitting unit from the reviewing system 220 to the selection system 140 is generated in response to information contained in at least one auxiliary signal.

Means for Responding to User-Flag Signal

In another preferred embodiment not depicted in FIG. 1, at least one reviewing system 220 has means for responding to a user-flag signal. The user-flag signal may comprise an audio signal (including an audio signal generated by a voice, a buzzer, or a whistle), a video signal, or any other type of signal known to persons of skill in the art. In a preferred embodiment, the user-flag signal is generated by the sound of a whistle at a football game. In another preferred embodiment, the user-flag signal is generated by the sound of a security alarm in a store, commercial premise or other location as known to persons of skill in the art.

In a preferred embodiment not depicted in FIG. 1, the means of the reviewing system 220 for responding to the user-flag signal comprises a receiver and a marker. The receiver of the reviewing system 220 comprises designs, components and circuitry for detecting and receiving user-flag signals as are known to persons of skill in the art.

In a preferred embodiment not depicted in FIG. 1, the reviewing system 220 has means for flagging a portion of at least one signal segment 112 in response to at least one user-flag signal. In a preferred embodiment, the flagging means of the reviewing system 220 comprises a marker. The marker comprises designs, components and circuitry, known to persons of skill in the art, for flagging or marking a signal segment 112 received by the reviewing system 220 essentially simultaneously with receipt of the user-flag signal by the receiver of the reviewing system 220.

By way of example, at a football game, the user-flag signal may comprise an audio signal generated by the sound of a whistle used by an official. A user-flag signal is generated each time a officials's whistle is blown. A receiver of the reviewing system 220 receives the user-flag signals. The marker of the reviewing system 220 essentially simultaneously flags a signal segment 112 received by the segment receiver 215 of the reviewing system 220 each time a user-flag signal is received by the receiver. By marking or flagging the signal segment 112, in response to a user-flag signal, the reviewing system 220 enables users of the present invention to identify readily the portion of the signal segment 112 corresponding to the time when the referee's whistle is blown. These preferred embodiments of the reviewing system 220 enable officials (using the reviewing systems 220 of the present invention) to review more quickly information in important portions of the signal segments 112.

In another preferred embodiment not depicted in FIG. 1, the reviewing system 220 contains means, in response to a user-rewind signal, for reviewing information in a portion of at least one signal segment 112 flagged by the marker. The user-rewind signal may comprise an audio signal (including an audio signal generated by a voice, a buzzer, or a whistle), a video signal, or any other type of signal known to persons of skill in the art. In a preferred embodiment, not depicted in FIG. 1, the user-rewind signal is generated by the sound of an official's voice or the voice of another user of the reviewing system 220 of the present invention.

In a preferred embodiment not depicted in FIG. 1, the means of the reviewing system 220 for responding to the user-rewind signal comprises a receiver and a rewind unit. The receiver of the reviewing system 220 comprises designs, components and circuitry for detecting and receiving user-rewind signals as are known to persons of skill in the art.

In a preferred embodiment not depicted in FIG. 1, the reviewing system 220 has means for rewinding a portion of at least one flagged signal segment 112 in response to at least one user-rewind signal. In a preferred embodiment the rewinding means of the reviewing system 220 comprises a rewind unit. The rewind unit comprises designs, components and circuitry for rewinding a signal segment, in response to the user-rewind signal, to the image corresponding to the point or location in the signal segment corresponding to the time when the user-flag signal was received. The rewind unit also contains means, known to persons of skill in the art, for causing the reviewing unit 220 to review the flagged portion of the signal segment.

In another preferred embodiment not depicted in FIG. 1, at least one reviewing system 220 has means for responding to a bookmark signal. The bookmark signal may comprise an audio signal, an electronic signal, or any other type of signal known to persons of skill in the art. In a preferred embodiment, the bookmark signal is generated by the reviewing system 220 by a signal generator (as described above) or other means known to persons of skill in the art. The bookmark signal is used to flag or mark a portion of a signal segment 112 received by the reviewing system 220. The bookmark signal enables the user of the present invention to identify a desired portion of the received signal segment 112 for review using the reviewing system 220 or by using a marker, a selection unit or other means for bookmarking signals as known to persons of skill in the art.

Simultaneous Operations of the Reviewing System

In a preferred embodiment, the reviewing system 220 can perform a combination of essentially simultaneous functions with respect to at least one signal segment 112. For example, in a preferred embodiment, the reviewing system 220 essentially simultaneously can receive a signal segment 112 using the segment receiver 215 and store the same signal segment 112 in a memory storage unit 212. The means for performing these essentially simultaneous functions are known to persons of skill in the art.

In another preferred embodiment, the receiving system 220 essentially simultaneously can receive a signal segment 112, store the same signal segment 112 in a memory storage unit 212, and review the information included in the same signal segment 112 on a video screen 210, an audio speaker, or other reviewing means. The means for performing these simultaneous functions are known to persons of skill in the art.

In another preferred embodiment, the reviewing system 220 essentially simultaneously can receive a signal segment 112, store the same signal segment 112 in a memory storage unit 212, review information included in the signal segment 112 on a video screen 210, the audio speaker, or other reviewing means, and manipulate the information on the video screen 210, the audio receiver, or other reviewing means. With this preferred embodiment, the beginning portion of information included in at least one signal segment 112 can be rewound, scaled or otherwise manipulated, while the remaining portion of the information included in at least one signal segment 112 is essentially simultaneously being received by the segment receiver 215 and stored in a memory storage unit 212.

Other examples of simultaneous performance of functions by reviewing system 220 (with respect to signal segments and/or auxiliary signals) will be apparent to those of skill in the art from this specification and from use of the device or system of the present invention.

SYSTEM COMPRISING A PLURALITY OF REVIEWING SYSTEMS

In another preferred embodiment not depicted in FIG. 1, the system of the present invention comprises a selection system 140 and a plurality of reviewing systems 220. In a preferred embodiment, the system of the present invention has means for activating at least one selected reviewing system 220 from the plurality of reviewing systems 220, and each selected reviewing system 220 operates in response to the activating means.

In a preferred embodiment, the activating means of the selected reviewing systems 220 comprise an encryption unit, as described above with reference to the selection system 140, and a decryption unit, as described above with reference to the reviewing system 220. In this preferred embodiment, the encryption unit of the selection system 140 encrypts at least one signal segment 112 or auxiliary signal transmitted from the selection system 140 to the reviewing systems 220. In this preferred embodiment, at least one of the plurality of reviewing systems 220 comprises a decryption unit which decrypts the encoded signal segment 112 or auxiliary signal received from the selection system 140. Only those selected reviewing systems 220 that include a suitable decryption unit will operate in response to receiving the encrypted signal segment from the selection system 140.

In another preferred embodiment, the selection system 140 contains a means for addressing a signal segment 112 or auxiliary signal to only selected reviewing systems 220. The addressing means comprises an address unit, as described above in the description of the selection system 140, and an address decoder, as described above in the description of the reviewing system 220. In this preferred embodiment, the address unit of the selection system 140 addresses at least one signal segment 112 or auxiliary signal transmitted from the selection system 140 to the reviewing systems 220. In a preferred embodiment, at least one of the plurality of reviewing systems 220 comprises an address decoder, which decodes the addressed signal segment 112 or auxiliary signal received from the selection system 140. Only those selected reviewing systems 220 that include an address decoder will operate in response to receiving the addressed signal segment from the selection system 140.

DEVICE FOR REVIEWING SIGNAL SEGMENTS

Figure 3:
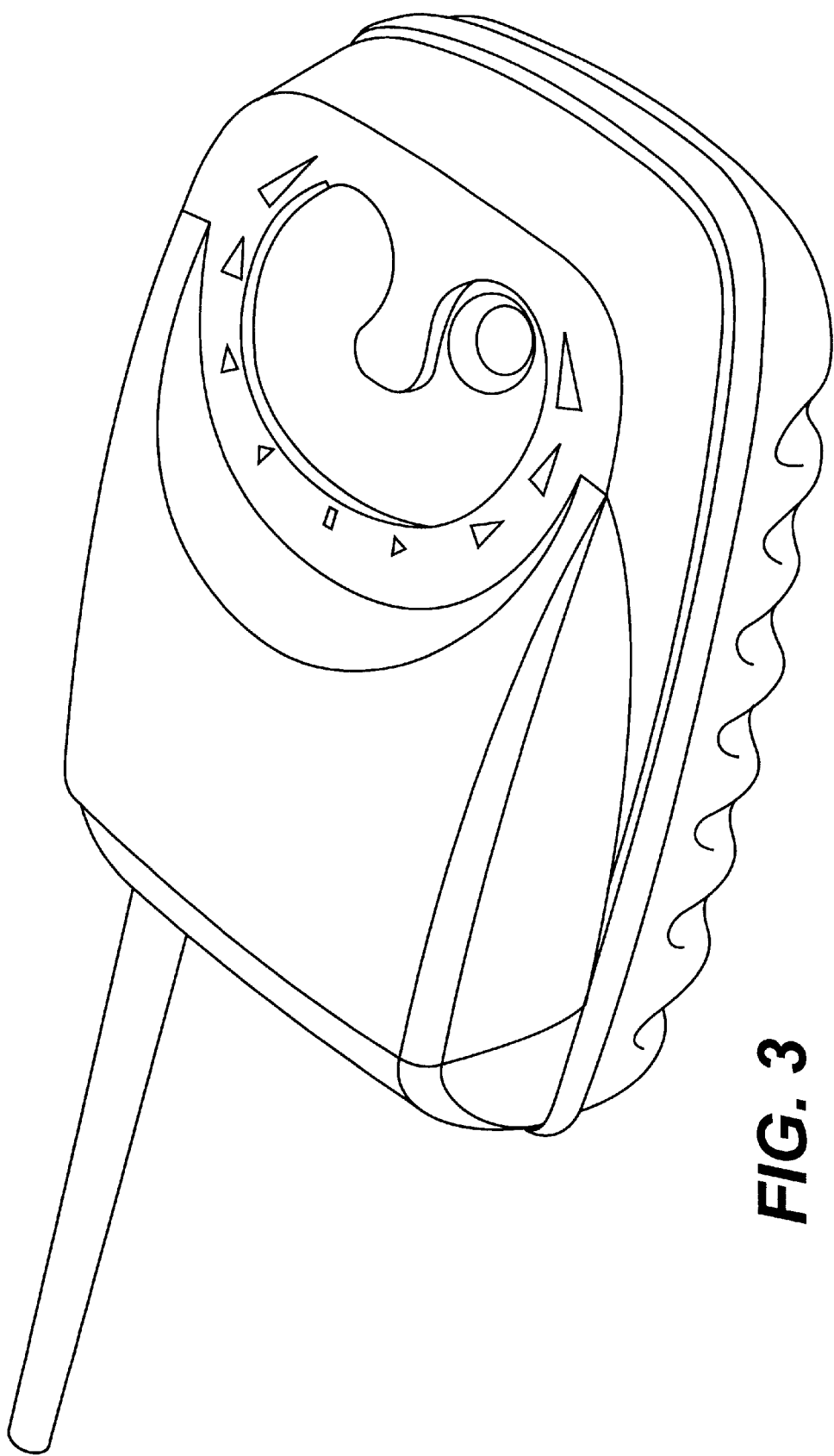
FIG. 3 is a diagram depicting a preferred embodiment of the device of the present invention for reviewing signal segments.

The reviewing system of the present invention for selecting and reviewing signal segments further encompasses a device for reviewing signal segments. The reviewing device provided by the present invention is described above in the specification as the reviewing system 220 of the system of selecting and reviewing signal segments of the present invention. FIG. 3 depicts a preferred embodiment of the device for reviewing signal segments.

METHOD FOR SELECTING AND REVIEWING SIGNAL SEGMENTS

Figure 2:
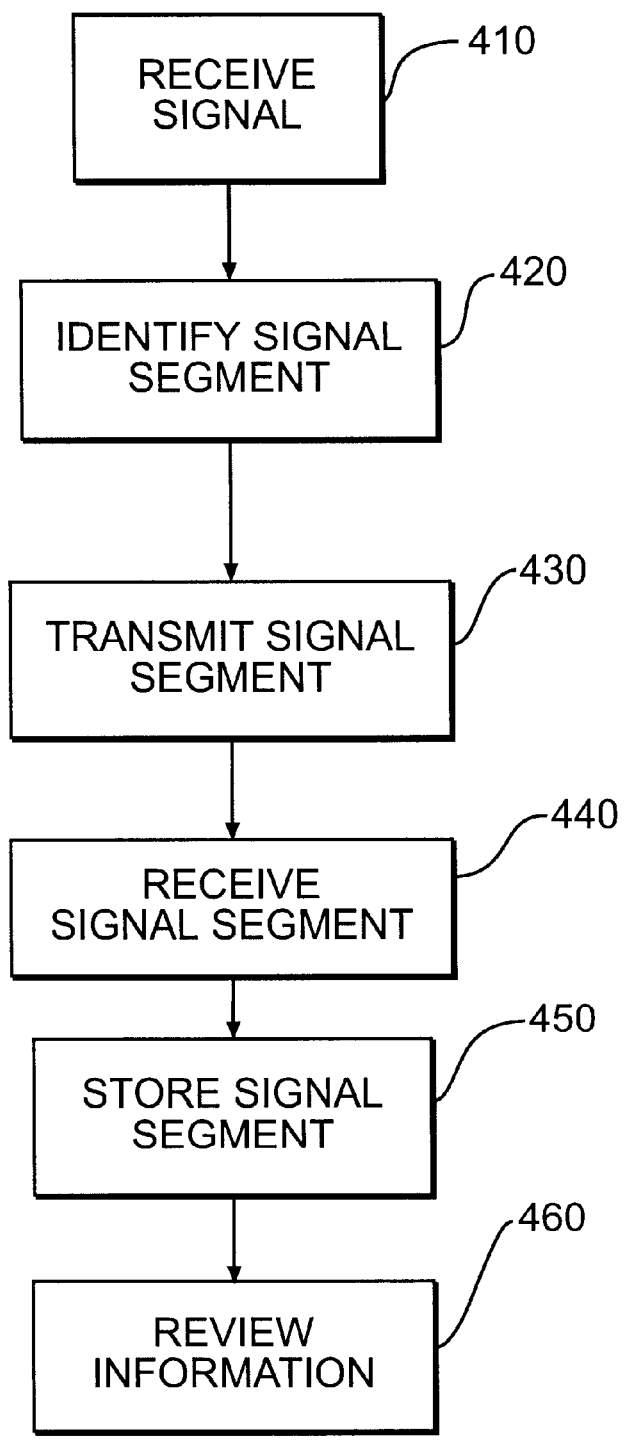
FIG. 2 is a flowchart depicting a preferred embodiment of the method of the present invention for selecting and reviewing signal segments.

FIG. 2 depicts a flow chart of a preferred embodiment of a method for selecting and reviewing signal segments of the present invention. The method includes the steps of receiving at least one signal; identifying at least one segment of at least one signal; transmitting at least one signal segment; receiving at least one signal segment; storing at least one signal segment; and reviewing information included in at least one signal segment.

Receive Signal Step

In a preferred embodiment depicted in FIG. 2, the receive signal step 410 is accomplished by receiving at least one transmitted signal such as the signal 110 depicted in FIG. 1, by a selection system, such as the selection system 140 depicted in FIG. 1. As described more fully with reference to FIG. 1, the signal 110 can comprise a television signal, an image, an audio signal, a security system signal, a control signal, any combination thereof, or any other type of signal known to persons of skill in the art. As described more fully with reference to FIG. 1, the signal may also comprise an audio signal or data information.

As also described more fully with reference to FIG. 1, the selection system 140 can comprise a receiving device 132 which can receive at least one signal 110 by co-axial cable 130, radio frequencies, wireless technologies, wire technologies, infra-red or fiber optic technologies, or any other means known to persons of skill in the art. The signal 110 received by the selection system 140 in the receive signal step 410 can be in either analog or digital format or any other signal format known to persons of skill in the art.

In a preferred embodiment not depicted in FIG. 2, as described more fully with reference to FIG. 1, the receive signal step further comprises the step of demodulating a received signal 110 to a baseband signal.

In a preferred embodiment not depicted in FIG. 2, and as described with reference to FIG. 1, the receive signal step comprises the step of converting at least one received analog signal, or any portion thereof, into a digital signal. The digital signal can be in any format known to persons of skill in the art, including formats having the characteristics of 16-bit pixels, 640×48 pixel resolution, and 30 frames per second.

In a preferred embodiment not depicted in FIG. 2, and as described more fully with reference to FIG. 1, the receive signal step comprises the further step of compressing digital signals or received digital signals, or both.

In a preferred embodiment not depicted in FIG. 2, and as described more fully with reference to FIG. 1, the receive signal step 410 further comprises the step of storing the received signals, the digital signals, the compressed signals or any combination thereof.

Identify Signal Segment Step

In a preferred embodiment depicted in FIG. 2, the identify signal segment step 420 is accomplished by a controller, such as controller 150 of FIG. 1, which identifies at least one segment, such as signal segment 112 of FIG. 1, of at least one signal, such as signal 110, depicted in FIG. 1. As described more fully with reference to FIG. 1, the signal segment 112 may comprise a portion of a signal 110, a digital signal, a compressed signal, a stored signal or at least one image or audio signal, or any combination thereof.

In a preferred embodiment not depicted in FIG. 2, the identify signal segment step 420 comprises the step of manually identifying at least one signal segment 112. The manual identify signal segment step is accomplished by a controller 150 comprising a manual identification system, as described more fully with reference to FIG. 1. As also described more fully with reference to FIG. 1, the manual identification system comprises a reviewing unit and a control unit.

In another preferred embodiment not depicted in FIG. 2, the manual identify signal segment step comprises the further step of reviewing at least one signal, signal segment digital signal, compressed signal or stored signal. In another preferred embodiment not depicted in FIG. 2, the manual identify signal segment step, comprises the further step of manipulating the signals, the signal segment, the digital signals, the compressed signals, and the stored signals. The manipulating step of the manual identify signal segment step may be accomplished using a manipulation element and the reviewing unit of the manual identification system, as described above with reference to FIG. 1. The manipulating step of the manual identify step also may be accomplished using a control unit in combination with a reviewing unit and a manipulation element of the manual identification system, or by other devices, systems and components as known to a person of skill in the art.

In another preferred embodiment not depicted in FIG. 2, and as described more fully with reference to FIG. 1, the identify signal segment step 420 is accomplished by a controller 150 responsive to a control signal. As described more fully with reference to FIG. 1, the control signal is received by the selection system 140 and contains information indicating when a signal segment 112 should begin, when a signal segment 112 should end, or both. In a preferred embodiment not depicted in FIG. 2, and as described more fully with reference to FIG. 1, the control signal is used to instruct the controller 150 to identify a signal segment 112 from another signal 10 received by a selection system 140. In a preferred embodiment, not depicted in FIG. 2, and as described more fully with reference to FIG. 1, the control signal indicates when each play at a sporting event begins and instructs the controller 150 to identify a signal segment 112 at the beginning of each play.

In another preferred embodiment not depicted in FIG. 2, the identify signal segment step 420 is accomplished by a controller 150 comprising an automatic identification system, as described more fully with reference to FIG. 1. In another preferred embodiment not depicted in FIG. 2, the identify segment step 420 does not occur.

In another preferred embodiment not depicted in FIG. 2, the identify signal segment step 420 comprises the further step of generating at least one auxiliary signal. The auxiliary signal step is accomplished by an auxiliary unit, as described more fully with reference to FIG. 1. As also described more fully with reference to FIG. 1, the auxiliary signal can comprise information describing at least one signal 110, at least one signal segment 112, or any information desired by the operator of the current method or the operator of the signal source(s). In another preferred embodiment not depicted in FIG. 2, the auxiliary signal step occurs in the transmit segment step 430.

In another preferred embodiment not depicted in FIG. 2, the identify signal segment step 420 comprises the further step of encrypting at least one signal segment 112 or auxiliary signal or combination thereof. The encrypting step is accomplished using an encryption unit, as discussed more fully with reference to FIG. 1. In another preferred embodiment not depicted in FIG. 2, the encrypting step occurs in the transmit signal segment step 430.

In another preferred embodiment not depicted in FIG. 2, the identify signal segment step 420 comprises the further step of addressing at least one signal segment 112 or auxiliary signal or combination thereof. The addressing step is accomplished using an addressing unit, as discussed more fully with reference to FIG. 1. In another preferred embodiment not depicted in FIG. 2, the addressing step occurs in the transmit segment step 430.

Transmit Signal Segment Step

In the preferred embodiment depicted in FIG. 2, the transmit signal segment step 430 is accomplished by a transmitter, such as transmitter 134 depicted in FIG. 1, which transmits at least one signal segment, such as signal segment 112 (in either encrypted or unencrypted format) depicted in FIG. 1, or one auxiliary signal (in either encrypted or unencrypted format) to at least one reviewing system 220, such as reviewing system 220 depicted in FIG. 1.

As described more fully with reference to FIG. 1, in a preferred embodiment, the transmitter 134 uses radio frequencies 190 to transmit signal segments 112 or auxiliary signals to at least one reviewing system 220. In an alternative preferred embodiment, and as described more fully with reference to FIG. 1, the transmit segment step 430 is accomplished using co-axial cable 180, copper wire, laser signals, wireless technologies, wire technologies, infra-red or fiber optic technologies, or other means known to persons of skill in the art. In a preferred embodiment, the transmit signal segment step 430 is accomplished in digital format. In an alternative preferred embodiment, the transmit signal segment step 430 is accomplished in analog format.

In a preferred embodiment not depicted in FIG. 2, and as described more fully with reference to FIG. 1, the transmit signal segment step 430 uses an antenna, such as the antenna 185 depicted in FIG. 1. As described above with reference to FIG. 1, the antenna can be either passive or active. As also described with reference to FIG. 1, the antenna can be located within or nearby the selection system 140.

In a preferred embodiment not depicted in FIG. 2, the transmit signal segment step 430 further comprises a converting signal step, a compressing signal step, or a storing signal step, or any combination thereof. These further steps all more fully described in the description of the receive signal step 410 contained herein.

In a preferred embodiment not depicted in FIG. 2, the transmit signal segment step 430 further comprises an encrypting step or an addressing step or a combination thereof. These further steps are more fully described in the description of the identify signal segment step 420 contained herein.

In a preferred embodiment not depicted in FIG. 2, and as described more fully with reference to FIG. 1, the transmit signal segment step 430 occurs essentially simultaneously as the receive signal step 410 and identify signal segment step 420 occur. In a preferred embodiment not depicted in FIG. 2, and as described more fully with reference to FIG. 1, the transmit signal segment step 430 does not occur essentially simultaneously as the receive signal step 410 and identify signal segment step 420 occur.

In a preferred embodiment not depicted in FIG. 2, the transmit segment step 430 causes at least one signal segment 112 and at least one auxiliary signal to be transmitted essentially simultaneously. In another preferred embodiment not depicted in FIG. 2, the transmit segment step 430 causes at least one signal segment 112 to be transmitted at a different time than at least one auxiliary signal.

Receive Signal Segment Step

In the preferred embodiment depicted in FIG. 2, the receive signal segment step 440 is accomplished by transmitting a signal segment, such as signal segment 112 depicted in FIG. 1 or an auxiliary signal, from the selection system, such as selection system 140 depicted in FIG. 1, to a reviewing system, such as a reviewing system 220 as depicted in FIG. 1. As described more fully with reference to FIG. 1, the reviewing system 220 comprises a segment receiver 215 which receives one or more signal segments 112 or auxiliary signals transmitted by the selection system 140. In a preferred embodiment, the receive signal segment step 440 is accomplished using radio frequencies 190, as described more fully with reference to FIG. 1. In other preferred embodiments, the receive signal segment step 440 is accomplished using co-axial cable, lasers, copper wire, wire technologies, wireless technologies, infra-red technologies or other means known to persons of skill in the art.

In a preferred embodiment, the receive signal segment step 440 uses a flexible antenna, as described more fully with reference to FIG. 1. In another preferred embodiment, the receive signal segment step 440 uses a non-flexible antenna, as described more fully with reference to FIG. 1. The antenna used in the receive signal segment step 440 can be either external or internal to the reviewing system 220 or retractable, as described more fully with reference to FIG. 1.

In another preferred embodiment not depicted in FIG. 2, the receive signal segment step 440 comprises the further step of decrypting an encrypted signal segment or auxiliary signal, or a combination thereof. In a preferred embodiment, the decrypting step is accomplished by a decryption unit, as described more fully with reference to FIG. 1. As described more fully with reference to FIG. 1, the decryption unit comprises designs, components and circuitry for decrypting signal segments 112 and auxiliary signals, or a combination thereof, as are known to persons of skill in the art.

In another preferred embodiment not depicted in FIG. 2, the receive signal segment step 440 comprises the further step of operating in response to an addressed signal segment or an addressed auxiliary signal, or a combination thereof. In a preferred embodiment, the operating step is accomplished by an address decoder, as described more fully with reference to FIG. 1. As described more fully with reference to FIG. 1, the address decoder comprises designs, components and circuitry for decrypting signal segments 112 or auxiliary signals, or a combination thereof; as are known to persons of skill in the art.

Store Signal Segment Step

In the preferred embodiment depicted in FIG. 2, the store signal segment step 450 is accomplished by storing at least one signal segment, such as signal segment 112 as depicted in FIG. 1, in at least one memory storage unit of a reviewing system, such as memory storage unit 212, as depicted in FIG. 1. In another preferred embodiment not depicted in FIG. 2, the store signal segment step also can be accomplished by storing at least one auxiliary signal in a memory storage unit, such as memory storage unit 212 as depicted in FIG. 1.

As described more fully with reference to FIG. 1, the memory storage unit 212 may comprise digital recording chips, analog recording chips, or other means known to persons of skill in the art. As also described more fully with reference to FIG. 1, in a preferred embodiment, at least one memory storage unit 212 has capacity to store a signal segment 112 of at least 120-seconds in duration. As also described more fully with reference to FIG. 1, in a preferred embodiment, at least one memory storage unit 212 has capacity to store a signal segment 112 of at least 115-seconds in duration. As also described more fully with reference to FIG. 1, in a preferred embodiment, at least one memory storage unit 212 has capacity to store a signal segment 112 of at least 90-seconds in duration. As also described more fully with reference to FIG. 1, in a preferred embodiment, at least one memory storage has capacity to store a signal segment 112 of at least 45-seconds in duration.

Review Information Step

In the preferred embodiment depicted in FIG. 2, the review information step 460 is accomplished by reviewing information included in at least one signal segment 112 or at least one auxiliary signal (or a combination thereof) on at least one reviewing means, using for example at least one video screen 210 as depicted in FIG. 1. As described more fully with reference to FIG. 1, in another preferred embodiment, the review information step 460 can be accomplished using at least one audio speaker or other reviewing device contained in the reviewing system 220.

In a preferred embodiment not depicted in FIG. 2, the review information step 460 comprises the further step of manipulating information included in at least one signal segment 112 or auxiliary signal. As described above with reference to FIG. 1, this manipulating step can be accomplished by using at least one manipulating unit 216 and one video screen 210, audio speaker, or other reviewing means.

In a preferred embodiment not depicted in FIG. 2, the manipulating step further comprises the step of changing the speed of review (i.e., fast-forwarding) of information included in at least one signal segment 112 or auxiliary signal. As described more fully with reference to FIG. 1, the fast-forwarding step may use at least one signal segment 112 or auxiliary signal and at least one video screen 210, audio speaker, or other reviewing means. In a preferred embodiment, the fast-forwarding step further comprises the step of adjusting the speed at which the images derived from the signal segment 112 or auxiliary signal are fast-forwarded.

In a preferred embodiment not depicted in FIG. 2, the manipulating step further comprises the step of repeatedly reviewing (i.e., rewinding or playing back) information included in at least one signal segment 112 or auxiliary signal. As described more fully with reference to FIG. 1, the rewinding or playing back step may use at least one signal segment 112 or auxiliary signal and at least one video screen 210, one audio speaker, or other reviewing means. In a preferred embodiment, the rewinding or playing back step further comprises the step of adjusting the speed at which the information included in the signal segment 112 or auxiliary signal are rewound or played back.

In a preferred embodiment not depicted in FIG. 2, and as described more fully with reference to FIG. 1, the manipulating step further comprises the step of freezing information included in at least one signal segment 112 or auxiliary signal. As described more fully with reference to FIG. 1, in one preferred embodiment, the freezing step comprises the freezing of at least one image on at least one video screen 210. As described more fully with reference to FIG. 1, in another preferred embodiment, the freezing step comprises freezing of an image derived from at least one signal segment 112 or auxiliary signal on at least one audio speaker or at least one other reviewing means.

In a preferred embodiment not depicted in FIG. 2, and as described more fully with reference to FIG. 1, the manipulating step further comprises the step of reviewing images derived from at least one signal segment 112 or auxiliary signal in slow motion. As described more fully with reference to FIG. 1, this slow motion step uses at least one signal segment 112 or auxiliary signal and at least one video screen 210, audio speaker, or other reviewing means. In a preferred embodiment, the slow motion step further comprises the step of adjusting the speed at which the images derived from at least one signal segment 112 or auxiliary signal are reviewed in slow motion.

In a preferred embodiment not depicted in FIG. 2, and as described more fully with reference to FIG. 1, the manipulating step further comprises the step of scaling information included in at least one signal segment 112 or auxiliary signal. As described more fully with reference to FIG. 1, in a preferred embodiment, the scaling step further comprises the step of enlarging the information. In another preferred embodiment, the scaling step further comprises the step of reducing the size of the information. In another preferred embodiment, the scaling step comprises the step of adjusting the size of the scaled image. In a preferred embodiment not depicted in FIG. 2, and as described more fully with reference to FIG. 1, the manipulating step may further comprise the step of selecting, for scaling, a portion of the image displayed on the video screen 210 of the reviewing means.

In a preferred embodiment not depicted in FIG. 2, and as described more fully with reference to FIG. 1, the method further comprises the step of transferring at least one signal segment 112 to a recording device. As described more fully with reference to FIG. 1, the recording device may comprise a VCR tape, a computer device or other device known to persons of skill in the art.

In a preferred embodiment not depicted in FIG. 2, and as described more fully with reference to FIG. 1, the method further comprises the step of erasing or deleting a signal segment 112. The erasing or deleting step is accomplished by a change unit or other means known to persons of skill in the art.

Communications Path Step

In a preferred embodiment not depicted in FIG. 2, the method of the present invention comprises the additional step of establishing a communications path between a selection system and a reviewing system, such as selection system 140 and reviewing system 220, as depicted in FIG. 1. In a preferred embodiment, the communications path further comprises the steps of generating a control signal by the reviewing system 220 and transmitting the control signal from the reviewing system 220 to the selection system 140.

In another preferred embodiment not depicted in FIG. 2, and as described more fully with reference to FIG. 1, the generating signal step comprises the further step of generating a control signal in response to information included in an auxiliary signal received by the reviewing system 220.

Generating Signal Step

In a preferred embodiment not depicted in FIG. 2, the generating signal step is accomplished using at least one signal generator in a reviewing system, such as the signal generator in reviewing system 220, as described more fully with reference to FIG. 1. In another preferred embodiment not depicted in FIG. 2, the generating signal step further comprises the step of generating a control signal in response to information included in the auxiliary signals, as described more fully with reference to FIG. 1. This auxiliary response step is accomplished by a selection device and a signal generator in the reviewing unit 220, such as the selection device and signal generator, as described more fully with reference to FIG. 1.

As described more fully with reference to FIG. 1, the selection device of the reviewing system 220 enables the user of the reviewing system 220 to select a signal segment 112 based on information included in the auxiliary signal. The signal generator of the reviewing system 220 generates at least one control signal in response to the selection of a desired signal segment by the user of the reviewing system 220.

Transmit Signal Step

In a preferred embodiment not depicted in FIG. 2, the transmit signal step is accomplished by a transmit unit in the reviewing system, such as the transmit unit in reviewing system 220 as described more fully with reference to FIG. 1. In a preferred embodiment, the transmit signal step transmits the control signal generated by the reviewing system 220 to the selection system 140, as described more fully with reference to FIG. 1. In a preferred embodiment the transmit signal step transmits a control signal from the reviewing system 220 to the selection system 140 in response to the selection of at least one desired signal segment 112 by the user of the reviewing system 220 based on information in the auxiliary system, as described more fully with reference to FIG. 1.

Segment Flag Step

In a preferred embodiment not depicted in FIG. 2, the method of the present invention further comprises the step of flagging a signal segment, in response to a user-flag signal, by a reviewing system, such as signal segment 112 and reviewing system 220 depicted in FIG. 1. As described with reference to FIG. 1, a user-flag signal may comprise an audio signal (including an audio signal generated by a voice, buzzer or a whistle), a video signal, or any other type of signal known to persons of skill in the art. In a preferred embodiment and as described more fully with reference to FIG. 1, the segment flag step responds to an audio user-flag signal. In another preferred embodiment, the user-flag signal is a signal generated by an official's whistle at a football game. As described more fully with reference to FIG. 1, the segment flag step is accomplished using a receiver and a marker in a reviewing system, such as the receiver and the marker in reviewing system 220.

Rewind Step

In another preferred embodiment not depicted in FIG. 2, the method of the present invention comprises the step of flagging a portion of at least one signal segment in response to a user-rewind signal. As described more fully with reference to FIG. 1, the rewind step is accomplished using a user-rewind signal, and a receiver and a rewind unit of a reviewing system, such as the user-rewind signal and the receiver and rewind unit included in reviewing system 220.

Bookmark Step

In another preferred embodiment not depicted in FIG. 2, the method of the present invention comprises the step of flagging a portion of at least one signal segment 112 using a bookmark signal, such as the bookmark signal, as described more fully with reference to FIG. 1. The bookmark step is accomplished using a marker, a selection device or other means for flagging or marking as known to persons of skill in the art, as described more fully with reference to FIG. 1.

Simultaneous Operation of Steps

In a preferred embodiment, several steps in the method depicted in the flow chart in FIG. 2 can be performed essentially simultaneously with respect to at least one signal segment 112 or auxiliary signal. For example, in a preferred embodiment, the receiving signal segment step 440, the storing signal segment step 450, and the reviewing information included in the signal segment step 460 operate essentially simultaneously in response to at least one signal segment 112 or auxiliary signal. As described more fully with reference to FIG. 1, the essentially simultaneous operation may be accomplished using a segment receiver 215 to receive a signal segment 112 or auxiliary signal, a memory storage unit 212 to store the same signal segment 112 or auxiliary signal, and a video screen 210, audio speaker or other reviewing means to review information included in the same signal segment 112 or auxiliary signal.

In another preferred embodiment, the receive signal segment step 440, the storing signal segment step 450, and the review information included in signal segment step 460 (including the manipulating step) operate essentially simultaneously in response to at least one signal segment 112 or auxiliary signal. As described more fully with reference to FIG. 1, the simultaneous operation may be accomplished using a segment receiver 215 to receive a signal segment 112, a memory storage unit 212 to store the same signal segment, and a video screen 210, audio speaker or other reviewing means to review and manipulate the same signal segment 112. The same operations can be performed essentially simultaneously with respect to an auxiliary signal, as described more fully with reference to FIG. 1.

In a preferred embodiment not depicted in FIG. 2, the steps of the method of the present invention may also be performed in any order, as will be apparent to one of skill in the art from review of this specification or from using the system or method of the present invention.

METHOD FOR REVIEWING SIGNAL SEGMENTS

Figure 4:
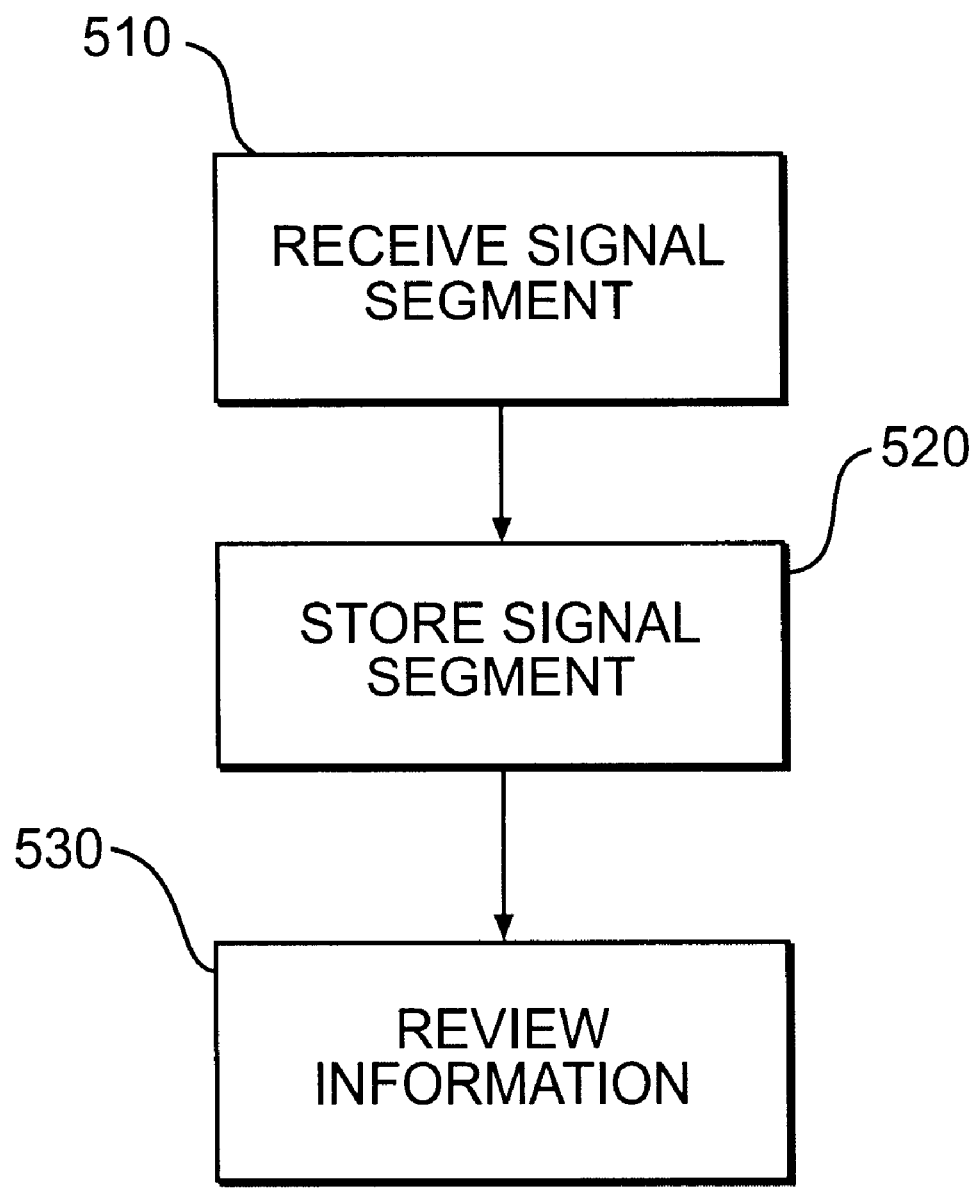
FIG. 4 is a flowchart depicting a preferred embodiment of the method of the present invention for reviewing signal segments.

FIG. 4 depicts a flow chart of the preferred embodiment of a method for reviewing signal segments. The method includes receiving at least one signal segment step 510, storing at least one signal segment step 520, and reviewing information included in at least one signal segment step 530. These steps, and means for implementing them, are described more fully in reference to FIGS. 1 and 2.

It will be apparent to those skilled in the art that various modifications can be made to this invention of a system and method for selecting and reviewing signal segments, without departing from the scope or spirit of the invention. It is also intended that the present invention cover modifications and variations of the system and method for selecting and reviewing signal segments within the scope of the foregoing description and its equivalents.

It will be apparent to those skilled in the art that various modifications can be made to this invention of a system, device and method for reviewing signal segments, without departing from the scope or spirit of the invention. It is also intended that the present inventions cover modifications and variations of the system, device and method for reviewing signal segments within the scope of the foregoing description and its equivalents.

I claim:

1. A system for selecting and reviewing image signal segments at a sporting event, comprising:
   a selection system including
      means for receiving at least one image signal,
      means for identifying at least one segment of at least one image signal, and
      means for transmitting at least one image signal segment; and
   a plurality of portable handheld reviewing systems, each reviewing system including
      means for receiving at least one image signal segment,
      means for storing at least one image signal segment, and
      means for reviewing information included in at least one image signal segment, and
      means for automatically flagging an image signal in response to an official's whistle at said sporting event for flagging a portion of at least one image signal segment,
   wherein the reviewing system, in response to a user-rewind signal, reviews information to the point or location corresponding to the time when the flag was received.

2. The system for selecting and reviewing image signal segments of claim 1, wherein the selection system is located in proximity to the sporting event.

3. The system for selecting and reviewing image signal segments of claim 1, wherein the selection system is located a distance from the sporting event responsive to the characteristics of at least one of the image signal source, the selection system, and one or more of the reviewing systems.

4. The system for selecting and reviewing image signal segments of claim 1, wherein the selection system is portable.

5. The system for selecting and reviewing image signal segments of claim 1, wherein the selection system is stationary.

6. The system for selecting and reviewing image signal segments of claim 1, wherein the selection system and the plurality of reviewing systems are at the same location.

7. The system for selecting and reviewing image signal segments of claim 1, wherein the selection system and the plurality of reviewing systems are at different locations.

8. The system for selecting and reviewing image signal segments of claim 1, wherein the image signal comprises a television signal.

9. The system for selecting and reviewing image signal segments of claim 8, wherein the television signal comprises a signal transmitted by a television broadcast van.

10. The system for selecting and reviewing image signal segments of claim 8, wherein the television signal comprises a signal essentially identical to a signal transmitted to viewers by a television broadcast station.

11. The system for selecting and reviewing image signal segments of claim 1, wherein the image signal comprises a signal transmitted to viewers by a video signal source provider.

12. The system for selecting and reviewing image signal segments of claim 11, wherein the image signal comprises a signal essentially identical to a signal transmitted to viewers by a video signal source provider.

13. The system for selecting and reviewing image signal segments of claim 1, wherein the image signal is derived from at least one image.

14. The system for selecting and reviewing image signal segments of claim 13, wherein the image depicts a sporting event.

15. The system for selecting and reviewing image signal segments of claim 1, wherein the image signal is derived from at least one instant replay image.

16. The system for selecting and reviewing image signal segments of claim 1, wherein the image signal comprises data information.

17. The system for selecting and reviewing image signal segments of claim 16, wherein the data information comprises a description of an event.

18. The system for selecting and reviewing image signal segments of claim 16, wherein the data information comprises statistical information.

19. The system for selecting and reviewing image signal segments of claim 16, wherein the data information comprises promotional information.

20. The system for selecting and reviewing image signal segments of claim 1, wherein the image signal comprises an audio signal.

21. The system for selecting and reviewing image signal segments of claim 1, wherein the image signal comprises a control signal.

22. The system for selecting and reviewing image signal segments of claim 21, wherein the control signal comprises a signal generated by a timing device.

23. The system for selecting and reviewing image signal segments of claim 21, wherein the control signal comprises a signal generated by a play clock at the sporting event.

24. The system for selecting and reviewing image signal segments of claim 21, wherein the control signal comprises a manually-generated signal.

25. The system for selecting and reviewing image signal segments of claim 1, wherein the receiving means of the selection system comprises means for receiving signals transmitted via wire technology.

26. The system for selecting and reviewing image signal segments of claim 1, wherein the receiving means of the selection system comprises means for receiving signals transmitted via wireless technology.

27. The system for selecting and reviewing image signal segments of claim 1, wherein the receiving means of the selection system comprises means for receiving signals in analog format.

28. The system for selecting and reviewing image signal segments of claim 1, wherein the receiving means of the selection system comprises means for receiving signals in digital format.

29. The system for selecting and reviewing image signal segments of claim 1, wherein the receiving means of the selection system comprises means for receiving signals in multiple formats.

30. The system for selecting and reviewing image signal segments of claim 1, wherein the receiving means of the selection system comprises at least one component selected from the group consisting of a demodulator, a tuner, an equalizing amplifier, a decoder, a compression unit, and a storage mechanism.

31. The system for selecting and reviewing image signal segments of claim 1, wherein the receiving means of the selection system comprises a microprocessor for controlling the functions of the receiving means.

32. The system for selecting and reviewing image signal segments of claim 1, wherein the identifying means is inactive.

33. The system for selecting and reviewing image signal segments of claim 1, wherein the identifying means comprises a controller.

34. The system for selecting and reviewing image signal segments of claim 33, wherein the controller comprises a manual identification system.

35. The system for selecting and reviewing image signal segments of claim 34, wherein the manual identification system comprises at least one reviewing unit and at least one control unit.

36. The system for selecting and reviewing image signal segments of claim 35, wherein the reviewing unit comprises at least one device for reviewing information included in the image signal.

37. The system for selecting and reviewing image signal segments of claim 35, wherein the control unit comprises means for inputting information into the selection system.

38. The system for selecting and reviewing image signal segments of claim 34, further comprising means for manipulating the image signal.

39. The system for selecting and reviewing image signal segments of claim 34, further comprising means for manipulating information included in at least one image signal.

40. The system for selecting and reviewing image signal segments of claim 34, further comprising means for manipulating information included in at least one image signal segment.

41. The system for selecting and reviewing image signal segments of claim 33, wherein the controller comprises an automatic identification system.

42. The system for selecting and reviewing image signal segments of claim 41, wherein the automatic identification system operates in response to at least one control signal.

43. The system for selecting and reviewing image signal segments of claim 1, wherein the transmitting means comprises a tuner.

44. The system for selecting and reviewing image signal segments of claim 1, wherein the transmitting means uses radio frequencies.

45. The system for selecting and reviewing image signal segments of claim 1, wherein the transmitting means uses television broadcast frequencies.

46. The system for selecting and reviewing image signal segments of claim 1, wherein the transmitting means comprises a passive antenna.

47. The system for selecting and reviewing image signal segments of claim 1, wherein the transmitting means comprises an active antenna.

48. The system for selecting and reviewing image signal segments of claim 1, wherein the transmitting means comprises means for transmitting signals in an analog format.

49. The system for selecting and reviewing image signal segments of claim 1, wherein the transmitting means comprises means for transmitting signals in a digital format.

50. The system for selecting and reviewing image signal segments of claim 1, wherein the transmitting means comprises at least one component selected from the group consisting of filters, decoders, compression units, and means for storing signals.

51. The system for selecting and reviewing image signal segments of claim 1, wherein the transmitting means comprises a microprocessor for controlling the functions of the transmitting means.

52. The system for selecting and reviewing image signal segments of claim 1, wherein the receiving means, the identifying means and the transmitting means of the selection system operate essentially simultaneously.

53. The system for selecting and reviewing image signal segments of claim 1, wherein the image signal segment is essentially identical to a signal transmitted to viewers by a video signal source provider.

54. The system for selecting and reviewing image signal segments of claim 1, wherein the image signal segment is derived from at least one image derived from at least one signal transmitted by a video signal source provider.

55. The system for selecting and reviewing image signal segments of claim 1, wherein the image signal segment is derived from at least one audio signal.

56. The system for selecting and reviewing image signal segments of claim 1, wherein the receiving means, the storing means, and the reviewing means of each reviewing system operate essentially simultaneously in response to at least one image signal segment.

57. The system for selecting and reviewing image signal segments of claim 1, wherein each reviewing system further comprises means for manipulating at least one image signal segment.

58. The system for selecting and reviewing image signal segments of claim 1, wherein each reviewing system further comprises means for manipulating information included in at least one image signal segment.

59. The system for selecting and reviewing image signal segments of claim 58, wherein the receiving means, the storing means, the reviewing means, and the manipulating means of each reviewing system operate essentially simultaneously in response to at least one image signal segment.

60. The system for selecting and reviewing image signal segments of claim 58, wherein the manipulating means comprises means for changing the speed of review of the information included in at least one image signal segment.

61. The system for selecting and reviewing image signal segments of claim 58, wherein the manipulating means comprises means for repeatedly reviewing information included in at least one image signal segment.

62. The system for selecting and reviewing image signal segments of claim 58, wherein the manipulating means comprises means for freezing information included in at least one image signal segment.

63. The system for selecting and reviewing image signal segments of claim 58, wherein the manipulating means comprises means for scaling information included in at least one image signal segment.

64. The system for selecting and reviewing image signal segments of claim 58, wherein the manipulating means comprises a microprocessor for controlling the functions of the manipulating means.

65. The system for selecting and reviewing image signal segments of claim 1, wherein each reviewing system further comprises means for erasing or deleting a stored image signal segment.

66. The system for selecting and reviewing image signal segments of claim 1, wherein each reviewing system further comprises means for transferring at least one image signal segment to a recording device.

67. The system for selecting and reviewing image signal segments of claim 1, wherein the receiving means of each reviewing system uses radio frequencies.

68. The system for selecting and reviewing image signal segments of claim 1, wherein the receiving means of each reviewing system comprises a flexible antenna.

69. The system for selecting and reviewing image signal segments of claim 1, wherein the receiving means of each reviewing system comprises a non-flexible antenna.

70. The system for selecting and reviewing image signal segments of claim 1, wherein the receiving means of each reviewing system comprises an omni-directional antenna.

71. The system for selecting and reviewing image signal segments of claim 1, wherein the receiving means of each reviewing system comprises a directional antenna.

72. The system for selecting and reviewing image signal segments of claim 1, wherein the receiving means of each reviewing system comprises an external antenna.

73. The system for selecting and reviewing image signal segments of claim 1, wherein the receiving means of each reviewing system comprises a retractable antenna.

74. The system for selecting and reviewing image signal segments of claim 1, wherein the receiving means of each reviewing system comprises an internal antenna.

75. The system for selecting and reviewing image signal segments of claim 1, wherein the storing means comprises at least one memory storage unit.

76. The system for selecting and reviewing image signal segments of claim 75, wherein the memory storage unit comprises digital recording devices.

77. The system for selecting and reviewing image signal segments of claim 75, wherein the memory storage unit comprises analog recording devices.

78. The system for selecting and reviewing image signal segments of claim 75, wherein at least one memory storage unit has capacity to store at least one image signal segment of at least 120-seconds in duration.

79. The system for selecting and reviewing image signal segments of claim 75, wherein at least one memory storage unit has capacity to store at least one image signal segment of at least 115-seconds in duration.

80. The system for selecting and reviewing image signal segments of claim 75, wherein at least one memory storage unit has capacity to store at least one image signal segment of at least 90-seconds in duration.

81. The system for selecting and reviewing image signal segments of claim 75, wherein at least one memory storage unit has the capacity to store at least one image signal segment of at least 45-seconds in duration.

82. The system for selecting and reviewing image signal segments of claim 1, wherein the reviewing means comprises at least one component selected from the group consisting of a video screen, an audio speaker and a microprocessor.

83. The system for selecting and reviewing image signal segments of claim 1, wherein each reviewing system further includes means for transmitting control signals, and the selection system further includes means for receiving the control signals.

84. The system for selecting and reviewing image signal segments of claim 83, wherein the identifying means comprises a controller.

85. The system for selecting and reviewing image signal segments of claim 84, wherein the controller is responsive to control signals transmitted by each reviewing system.

86. The system for selecting and reviewing image signal segments of claim 85, wherein the selection system further includes means for transmitting auxiliary signals to each reviewing system, and each reviewing system further includes means for receiving the auxiliary signals.

87. The system for selecting and reviewing image signal segments of claim 86, wherein each reviewing system further includes means for reviewing information included in the auxiliary signals.

88. The system for selecting and reviewing image signal segments of claim 87, wherein each reviewing system further includes means for generating control signals in response to information included in the auxiliary signals.

89. The system for selecting and reviewing image signal segments of claim 86, wherein the auxiliary signals include information concerning at least one image signal received by the selection system.

90. The system for selecting and reviewing image signal segments of claim 86, wherein the auxiliary signals include information concerning at least one image signal segment.

91. The system for selecting and reviewing image signal segments of claim 83, wherein the selection system further includes means for transmitting auxiliary signals to each reviewing system, and each reviewing system further includes means for receiving the auxiliary signals.

92. The system for selecting and reviewing image signal segments of claim 91, wherein each reviewing system further includes means for reviewing information included in the auxiliary signals.

93. The system for selecting and reviewing image signal segments of claim 92, wherein each reviewing system further includes means for generating control signals, for transmission to the selection system, in response to information included in the auxiliary signals.

94. The system for selecting and reviewing image signal segments of claim 91, wherein the auxiliary signals include information concerning at least one image signal received by the selection system.

95. The system for selecting and reviewing image signal segments of claim 91, wherein the auxiliary signals include information concerning at least one image signal segment.

96. The system for selecting and reviewing image signal segments of claim 1, wherein the selection system further includes means for encrypting the image signal segment transmitted to the reviewing systems, and each reviewing system further includes means for decrypting the encoded image signal segment.

* * * * *